US012679052B2

(12) United States Patent
Nishimura et al.

(10) Patent No.: US 12,679,052 B2
(45) Date of Patent: Jul. 14, 2026

(54) CURVE SHAPING APPARATUS

(71) Applicants: TSUDAKOMA KOGYO KABUSHIKI KAISHA, Ishikawa-ken (JP); KANAZAWA INSTITUTE OF TECHNOLOGY, Ishikawa (JP)

(72) Inventors: Isao Nishimura, Ishikawa-ken (JP); Koji Yamamura, Ishikawa-ken (JP); Nobuya Kawamoto, Ishikawa-ken (JP); Kiyoshi Uzawa, Ishikawa-ken (JP)

(73) Assignees: TSUDAKOMA KOGYO KABUSHIKI KAISHA, Ishikawa-ken (JP); KANAZAWA INSTITUTE OF TECHNOLOGY, Ishikawa (JP)

( * ) Notice: Subject to any disclaimer, the term of this patent is extended or adjusted under 35 U.S.C. 154(b) by 135 days.

(21) Appl. No.: 18/894,002

(22) Filed: Sep. 24, 2024

(65) Prior Publication Data

US 2025/0115012 A1      Apr. 10, 2025

(30) Foreign Application Priority Data

Oct. 10, 2023     (JP) ................................. 2023-174991

(51) Int. Cl.
*B29C 70/52* (2006.01)

(52) U.S. Cl.
CPC .......... *B29C 70/527* (2013.01); *B29C 70/528* (2013.01)

(58) Field of Classification Search
CPC ........................... B29C 70/527; B29C 70/528
USPC ........................................................ 425/122
See application file for complete search history.

(56) References Cited

U.S. PATENT DOCUMENTS

| 2009/0078362 A1 | 3/2009 | Wilkerson et al. |
| 2011/0048624 A1 | 3/2011 | Nitsch |
| 2018/0311917 A1 | 11/2018 | Klimovski et al. |

FOREIGN PATENT DOCUMENTS

JP            2009-078554 A      4/2009

OTHER PUBLICATIONS

Feb. 10, 2025, European Search Report issued for related EP Application No. 24202836.3.

*Primary Examiner* — Christina A Johnson
*Assistant Examiner* — Xue H Liu
(74) *Attorney, Agent, or Firm* — Paratus Law Group, PLLC

(57)            ABSTRACT

A curve shaping apparatus includes: a heating device provided in a path and heats a reinforcing fiber material; a clamping mechanism switches between a clamping state and a non-clamping state; a swing mechanism including a gripping unit that switches between a gripping state and a non-gripping state, the swing mechanism rotationally drives the gripping unit between an initial position and a rotation position; a shaping mechanism including a shaping mold unit that includes an upper mold, a lower mold, and a pair of side molds for shaping the reinforcing fiber material; a pulling-out mechanism performs a pulling-out operation; and a drive control device configured to control drive of each mechanism so that each process of a rotation process, a pulling-out process, and a shaping process is performed.

4 Claims, 19 Drawing Sheets

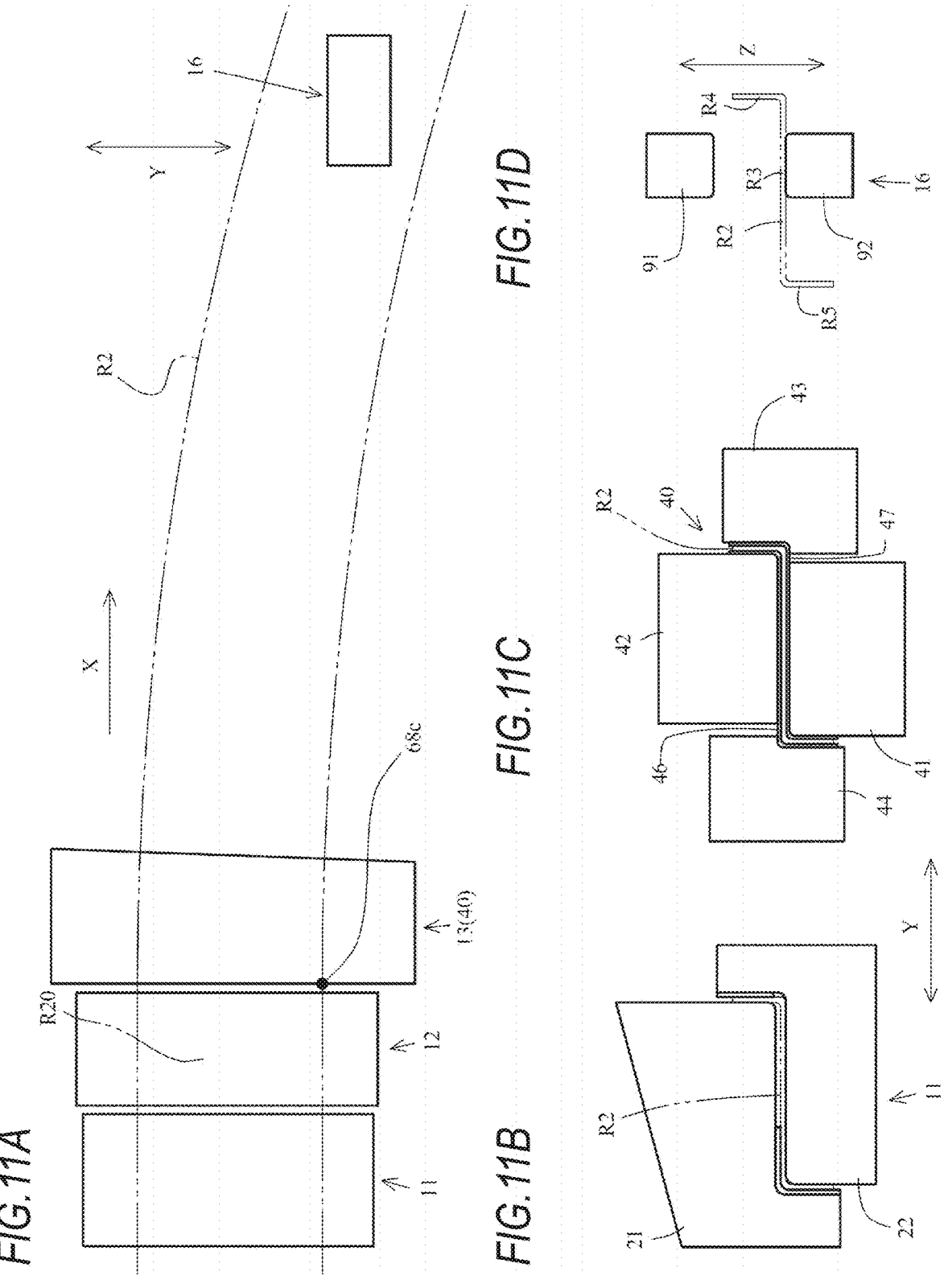

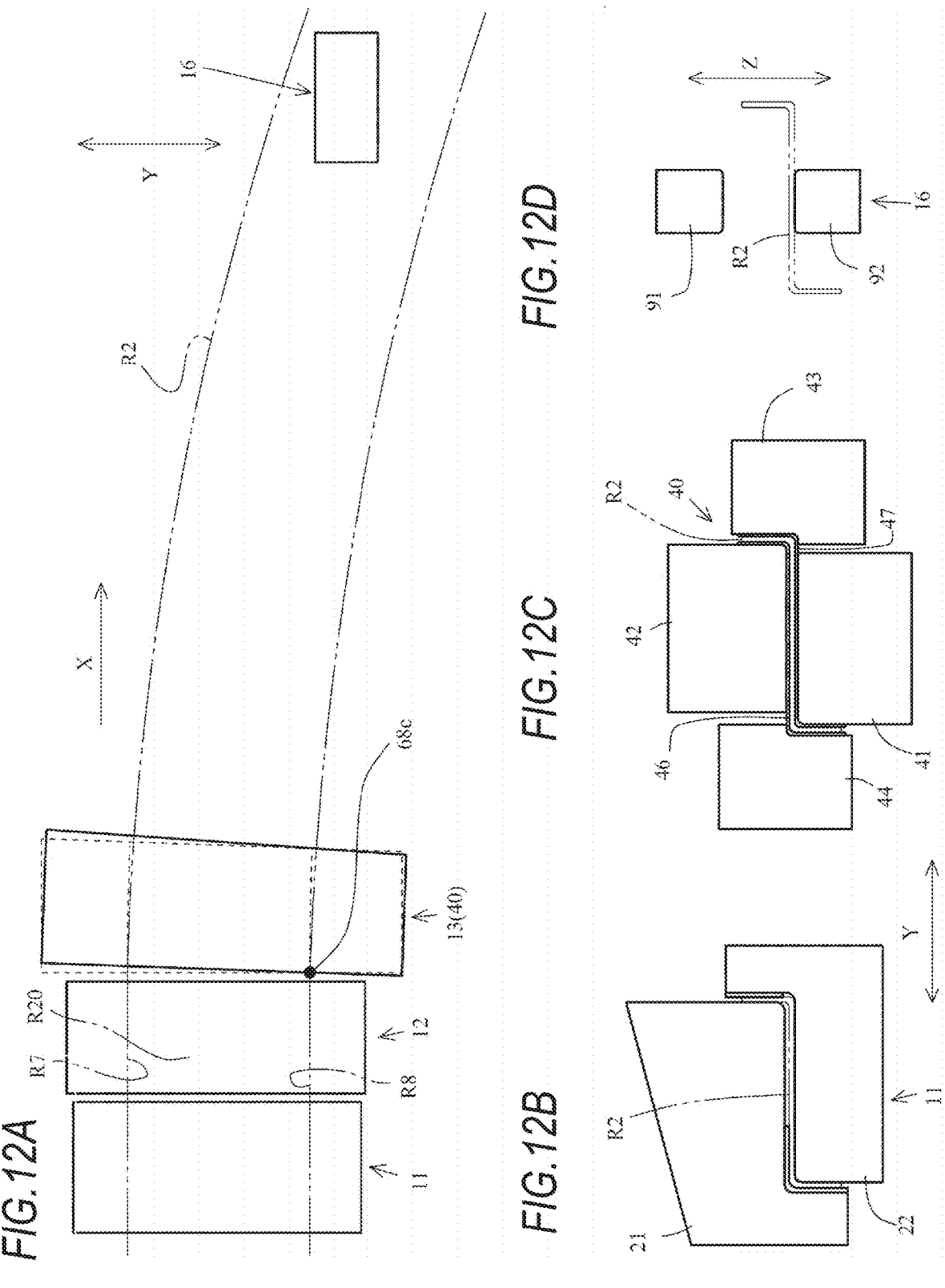

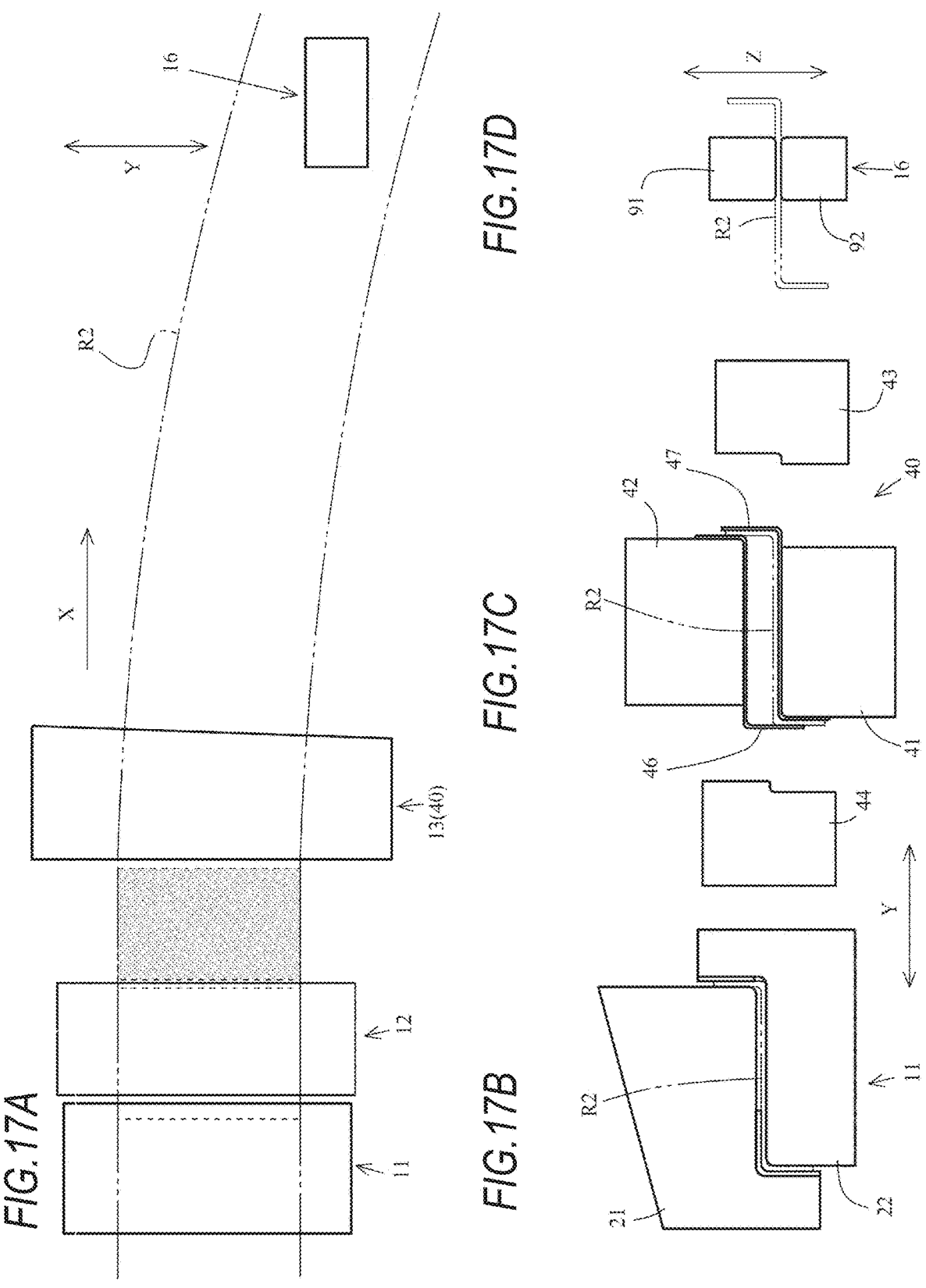

CURVE SHAPING APPARATUS

CROSS-REFERENCE TO RELATED APPLICATION(S)

This application is based on and claims priority under 35 USC 119 from Japanese Patent Application No. 2023-174991 filed on Oct. 10, 2023, the contents of which are incorporated herein by reference.

TECHNICAL FIELD

The present invention relates to a curve shaping apparatus for shaping a reinforcing fiber material so as to form a curve in a plan view while conveying the same on a defined path, the reinforcing fiber material being formed by molding a long sheet shaped reinforcing fiber base material in which a thermoplastic resin is used as a matrix material and a reinforcing fiber is oriented at an angle with respect to a longitudinal direction.

BACKGROUND ART

In recent years, aircraft-related components, vehicle-related components, sports/leisure products, and the like are formed of reinforcing fiber materials. Note that the reinforcing fiber material referred to here is a material manufactured by molding a reinforcing fiber base material such as prepreg by applying pressure and heating, or the like. In addition, the reinforcing fiber base material (prepreg), which is the basis of the reinforcing fiber material, is a sheet-like (sheet-shaped) material made by impregnating a matrix material (resin) into reinforcing fibers such as carbon fibers, glass fibers, or aramid fibers. In addition, examples of the reinforcing fiber base material include a material in which the reinforcing fibers are oriented at an angle (for example, 45° or 90°) with respect to a longitudinal direction thereof.

In addition, as the matrix resin, there are a thermosetting resin and a thermoplastic resin. Additionally, it is known that a reinforcing fiber base material using the thermoplastic resin as a matrix material is superior to one using the thermosetting resin in terms of moldability. Therefore, in recent years, a thermoplastic resin, which has such an advantage, is preferred and used as a matrix material for a reinforcing fiber base material for molding a reinforcing fiber material.

It is also known that a component formed in a curved shape, such as a frame material of the fuselage of an aircraft as the aircraft-related components described above, is formed of the reinforcing fiber material. As an apparatus for manufacturing a curved reinforcing fiber material from a reinforcing fiber base material using a thermoplastic resin as a matrix material as described above, for example, there is an apparatus disclosed in Patent Literature 1 below (hereinafter, referred to as the "apparatus of the related art").

The apparatus of the related art is an apparatus configured such that a reinforcing fiber base material using a thermoplastic resin as a matrix material (hereinafter, simply referred to as "reinforcing fiber base material") is molded into a straight reinforcing fiber material and then the reinforcing fiber material is shaped into a curved shape. Therefore, the apparatus of the related art includes a preliminary molding device for forming a plurality of long sheet shaped reinforcing fiber base materials prepared in a form of being rolled on a spool so that a cross-sectional shape forms a U-shape in a state in which they are overlapped, and a curved part for shaping a reinforcing fiber material molded by the preliminary molding device into a curved shape.

In the apparatus of the related art, the reinforcing fiber material molded as described above is conveyed on a path defined by each component on the apparatus, and the reinforcing fiber material passes through the curved part, resulting in being shaped into a curved shape. Note that the curve shaping of the reinforcing fiber material in the curved part is made by heating and pressurizing the reinforcing fiber material as it passes through a curved path in the curved part.

CITATION LIST

Patent Literature

Patent Literature 1: JP2009-78554A

However, the apparatus of the related art is configured to shape the straight reinforcing fiber material molded as described above into a curved shape by passing it through the curved part forming a curved shape with heating and pressurization. However, while the straight material has both side edges of the same length, the curved material after shaping has both side edges of different lengths (the outer side edge is longer than the inner side edge).

In addition, when shaping a material having both side edges of the same length into a material having both side edges of different lengths, in the method of shaping a straight material into a curved shape by passing it through a curved part while performing heating and pressurization as in the apparatus of the related art, there is a high possibility that an inner portion of the material will be crushed, making it impossible to shape the material (especially a surface portion) into a desired shape. In this case, a problem arises in which the desired quality or desired strength is not obtained for the material.

SUMMARY

In view of the above-described situations, an object of the present invention is to provide a configuration for a curve shaping apparatus for shaping a reinforcing fiber material in a curved shape, in which the problems described above do not occur, the reinforcing fiber material being formed by molding a reinforcing fiber base material in which a thermoplastic resin is used as a matrix material.

A preamble of the present invention is a curve shaping apparatus for shaping a reinforcing fiber material so as to form a curve in a plan view while conveying the same on a defined path, the reinforcing fiber material being formed by molding a long sheet shaped reinforcing fiber base material in which a thermoplastic resin is used as a matrix material and a reinforcing fiber is oriented at an angle with respect to a longitudinal direction. In addition, in order to achieve the above object, the present invention is characterized by including a heating device, a clamping mechanism, a swing mechanism, a shaping mechanism, a pulling-out mechanism, and a drive control device as described below.

The heating device is provided in the path and is configured to heat the reinforcing fiber material to a temperature equal to or higher than a deformable temperature at which the reinforcing fiber material enters a deformable state. The clamping mechanism is provided upstream of the heating device and is configured to be switchable between a clamping state in which at least both end portions of the reinforcing fiber material are clamped and a non-clamping state in which the clamping state is released. The swing mechanism includes a gripping unit provided downstream of the heating device and configured to be switchable between a gripping state in which at least both end portions of the reinforcing fiber material are gripped and a non-gripping state in which the gripping state is released. In addition, the swing mechanism is configured to rotationally drive the gripping unit between an initial position and a rotation position downstream of the initial position about a position of one side edge of the reinforcing fiber material or a position on a center side of the curve with respect to the side edge as a center of rotation. The shaping mechanism includes a shaping mold unit provided adjacent to the heating device on a downstream side of the heating device and including an upper mold, a lower mold, and a pair of side molds for shaping the reinforcing fiber material. In addition, the shaping mechanism is configured to heat the shaping mold unit to a temperature lower than the deformable temperature and drive the shaping mold unit to perform a shaping operation. The shaping mechanism is configured such that, in order to shape the reinforcing fiber material into a curved shape, an outer shaping surface of each side mold of the shaping mold unit for shaping the reinforcing fiber material is formed as a curved surface for realizing the curve and an inner shaping surface of the upper mold and/or the lower mold facing the outer shaping surface is formed as a curved surface parallel to the outer shaping surface. The pulling-out mechanism is provided downstream of the heating device and is configured to perform a pulling-out operation of pulling out a portion of the reinforcing fiber material heated by the heating device to a position where the shaping operation by the shaping mold unit is performed. The drive control device is configured to control drive of each mechanism so that each process of a rotation process of bringing the clamping mechanism into the clamping state and bringing the gripping unit positioned at the initial position by the swing mechanism into the gripping state and then rotating the gripping unit toward the rotation position, a pulling-out process of bringing the clamping mechanism into the non-clamping state and then causing the pulling-out mechanism to perform the pulling-out operation, and a shaping process of causing the shaping mold unit to perform the shaping operation by the shaping mechanism is performed in the order of the rotation process, the pulling-out process, and the shaping process.

In addition, in the curve shaping apparatus of the present invention, the shaping mold unit may be configured to function as the gripping unit, and the shaping mechanism may be configured to rotationally drive the shaping mold unit between the initial position and the rotation position and to function as the swing mechanism.

In addition, in addition to functioning as the swing mechanism, the shaping mechanism may be configured to cause the shaping mold unit to perform the pulling-out operation and to function as the pulling-out mechanism.

In addition, the curve shaping apparatus of the present invention may be provided with the following holding mechanism. The holding mechanism is provided downstream of the swing mechanism and is configured to be switchable between a holding state in which the reinforcing fiber material is held and a non-holding state in which the holding state is released. In addition, the drive control device is configured to control drive of the holding mechanism so that the holding mechanism is kept in the holding state when rotating the gripping unit positioned at the rotation position toward the initial position.

In the curve shaping apparatus according to the present invention, as a series of processes, first, the rotation process of bringing the gripping unit at the initial position into the gripping state, and then rotating the gripping unit toward the rotation position is performed. Thereby, the portion of the reinforcing fiber material heated by the heating device on the upstream side of the gripping unit (hereinafter, referred to as the "heated portion") is extended toward the rotation position. As a result, the heated portion is in a state in which lengths of both side edges are different. Note that the rotation operation of the gripping unit is performed about a position of one side edge of the reinforcing fiber material or a position on a center side of the curve with respect to the side edge, as a center of rotation. Therefore, because the one side edge in the heated portion is not moved toward the heating device by the rotation operation, a portion on the side edge side is not crushed.

Next, the pulling-out process of causing the pulling-out mechanism to perform the pulling-out operation is performed. Thereby, the heated portion is positioned at a position where the shaping operation is performed by the shaping mold unit in the shaping mechanism. Additionally, by performing the shaping process in which the shaping operation accompanied by heating and pressurization is performed by the shaping mold unit including a mold of which shaping surface is formed as a curved surface, the heated portion is shaped into a curved shape.

In this way, according to the curve shaping apparatus according to the present invention, before shaping the straight reinforcing fiber material into a curved shape, the heated portion of the reinforcing fiber material is brought into a state in which the lengths of both the side edges are different, similar to the case of the curved shape. Then, the shaping operation by the shaping mold unit as described above is performed on the heated portion in the state in which the lengths of both the side edges are made different, the reinforcing fiber material is shaped into a curved shape. Thereby, compared to the above-described method using the apparatus of the related art in which the straight reinforcing fiber material having both side edges of the same length is directly shaped into a curved shape, it is possible to prevent the inner portion of the reinforcing fiber material from being crushed as much as possible. As a result, a curved reinforcing fiber material with desired quality and strength can be manufactured.

In addition, the shaping mold unit functions as the gripping unit, and the shaping mechanism is configured so that the shaping mold unit is rotationally driven between the initial position and the rotation position, and accordingly the shaping mechanism also functions as the swing mechanism. As a result, the overall configuration of the curve shaping apparatus can be simplified.

In addition, the shaping mechanism, which also functions as the swing mechanism, is configured so that the shaping mold unit performs the pulling-out operation, making the shaping mechanism function also as the pulling-out mechanism. As a result, the overall configuration of the curve shaping apparatus can be further simplified.

In addition, the holding mechanism configured to be switchable between the holding state and the non-holding state is provided downstream of the swing mechanism, and the curve shaping apparatus is configured so that the holding mechanism is brought into the holding state when the gripping unit rotates from the rotation position toward the initial position. Accordingly, for preventing positional misalignment of the reinforcing fiber material accompanied by the rotation operation of the gripping unit toward the initial position, the configuration for preventing the positional displacement (hereinafter, referred to as "positional misalignment prevention configuration") becomes simpler, and complexity of the configuration of the curve shaping apparatus can be avoided.

More specifically, in some cases, since the temperature of the reinforcing fiber material immediately after being shaped by the shaping mechanism is still high and the surface thereof is in a viscous state, as the gripping unit rotates toward the initial position, the reinforcing fiber material moves back to the upstream side of the path in the form of being accompanied by the gripping unit, that is, positional misalignment of the reinforcing fiber material occurs. Note that if the positional misalignment occurs, it may adversely affect the curve shaping. Therefore, it is necessary to provide the curve shaping apparatus with a positional misalignment prevention configuration so as to prevent such positional misalignment.

However, if the swing mechanism including the gripping unit involved in the positional misalignment is provided with the positional misalignment prevention configuration, the configuration of the swing mechanism becomes complicated because the swing mechanism is configured to switch the gripping unit between the gripping state and the non-gripping state and to rotationally drive the gripping unit. This leads to complexity of the configuration of the curve shaping apparatus.

In contrast, the holding mechanism provided downstream of the swing mechanism separately from the swing mechanism is provided as the positional misalignment prevention configuration, so that, compared to the case where the swing mechanism is provided with the positional misalignment prevention configuration as described above, the positional misalignment prevention configuration itself can be made as a simple configuration, resulting in avoiding complexity of the configuration of the curve shaping apparatus.

BRIEF DESCRIPTION OF DRAWINGS

FIGS. 11A to 11D are illustrative diagrams showing an operation for shaping a reinforcing fiber material, in which FIG. 11A is a plan view, FIG. 11B is a front view of the clamping mechanism, FIG. 11C is a simplified front view of the shaping mold unit, and FIG. 11D is a front view of the holding mechanism.

FIGS. 12A to 12D are illustrative diagrams showing a next operation of FIGS. 11A to 11D.

FIGS. 17A to 17D are illustrative diagrams showing a next operation of FIGS. 16A to 16D.

DESCRIPTION OF EMBODIMENTS

Hereinafter, one embodiment (embodiment) of the curve shaping apparatus according to the present invention will be described with reference to FIGS. 1 to 18.

Figure 1:
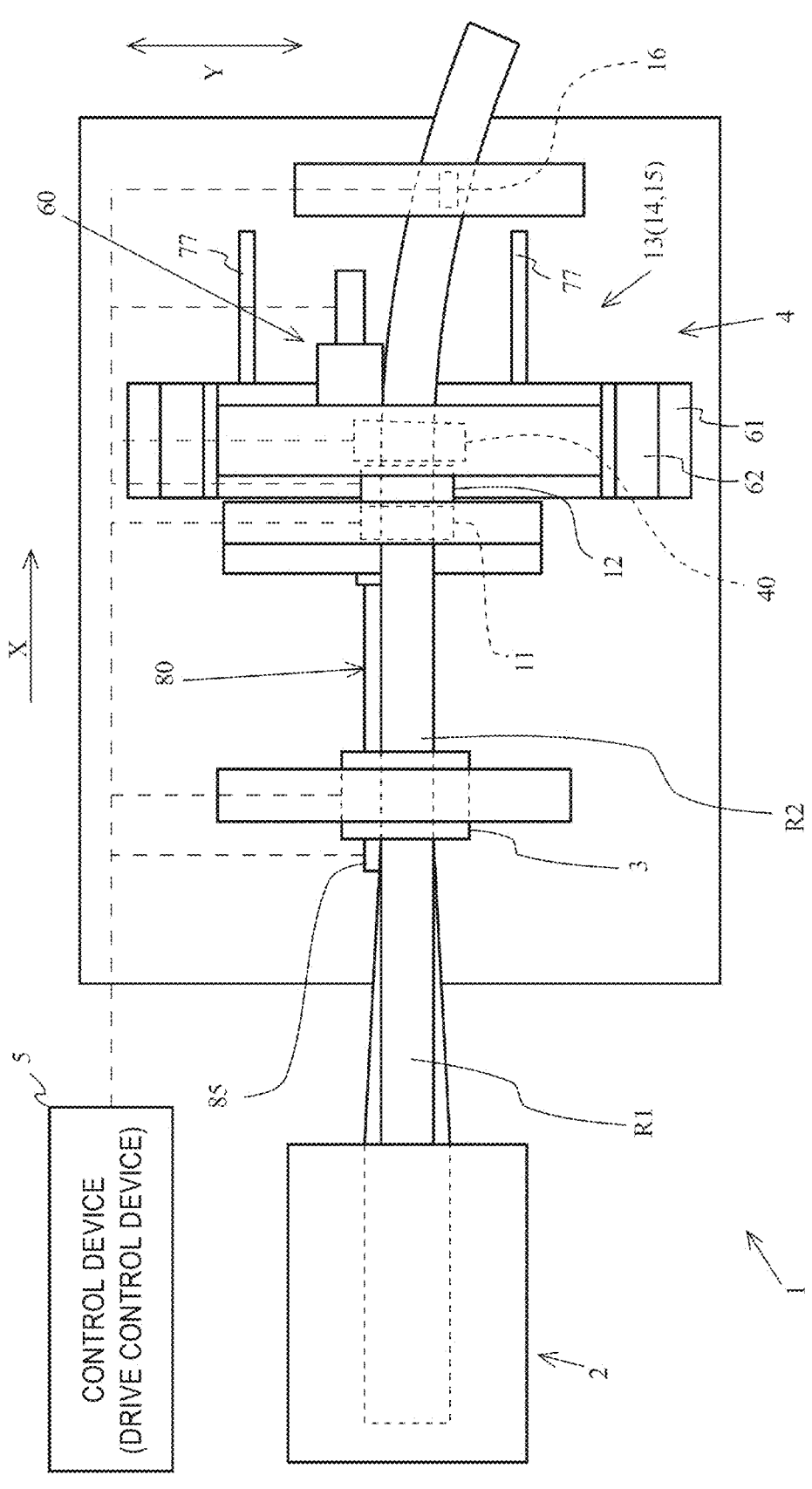
FIG. 1 is a plan view showing a continuous molding machine to which an embodiment of the curve shaping apparatus of the present invention is applied.
Figure 2:
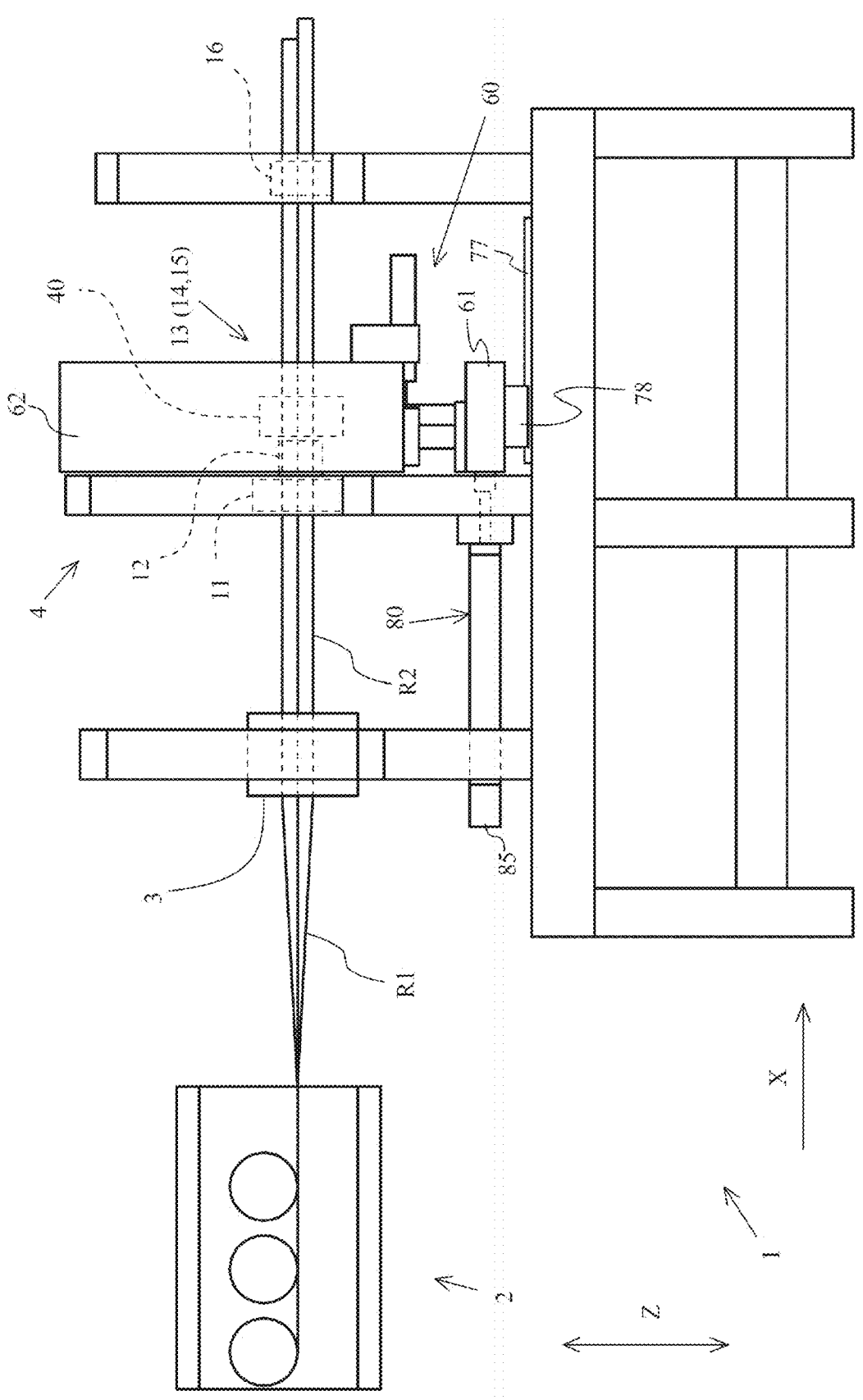
FIG. 2 is a side view of FIG. 1.

Note that, as shown in FIGS. 1 and 2, the present embodiment is an example where a curve shaping apparatus 4 is provided as a part of a continuous molding machine 1 including a molding mechanism 3 for molding a reinforcing fiber base material R1 into a reinforcing fiber material R2. More specifically, the present embodiment is an example of the continuous molding machine 1 configured such that a plurality of sheet-like reinforcing fiber base materials R1 supplied from a supply device 2 are molded into a reinforcing fiber material R2 by the molding mechanism 3 and the molded reinforcing fiber material R2 is continuously conveyed to the curve shaping apparatus 4.

In addition, in the present embodiment, it is assumed that the number of reinforcing fiber base materials R1 supplied by the supply device 2 is 3 sheets. However, in the three reinforcing fiber base materials R1, carbon fibers are used as reinforcing fibers, and orientation directions of the reinforcing fibers form different angles (45°, 90°, and 135°) with respect to the longitudinal direction. In addition, in the present embodiment, it is assumed that the molding mechanism 3 is configured to mold the reinforcing fiber base material R1 into the reinforcing fiber material R2 having a Z-shaped cross-sectional shape. Each device of the continuous molding machine 1 including the molding mechanism 3 will be described in detail, as follows.

Figure 3:
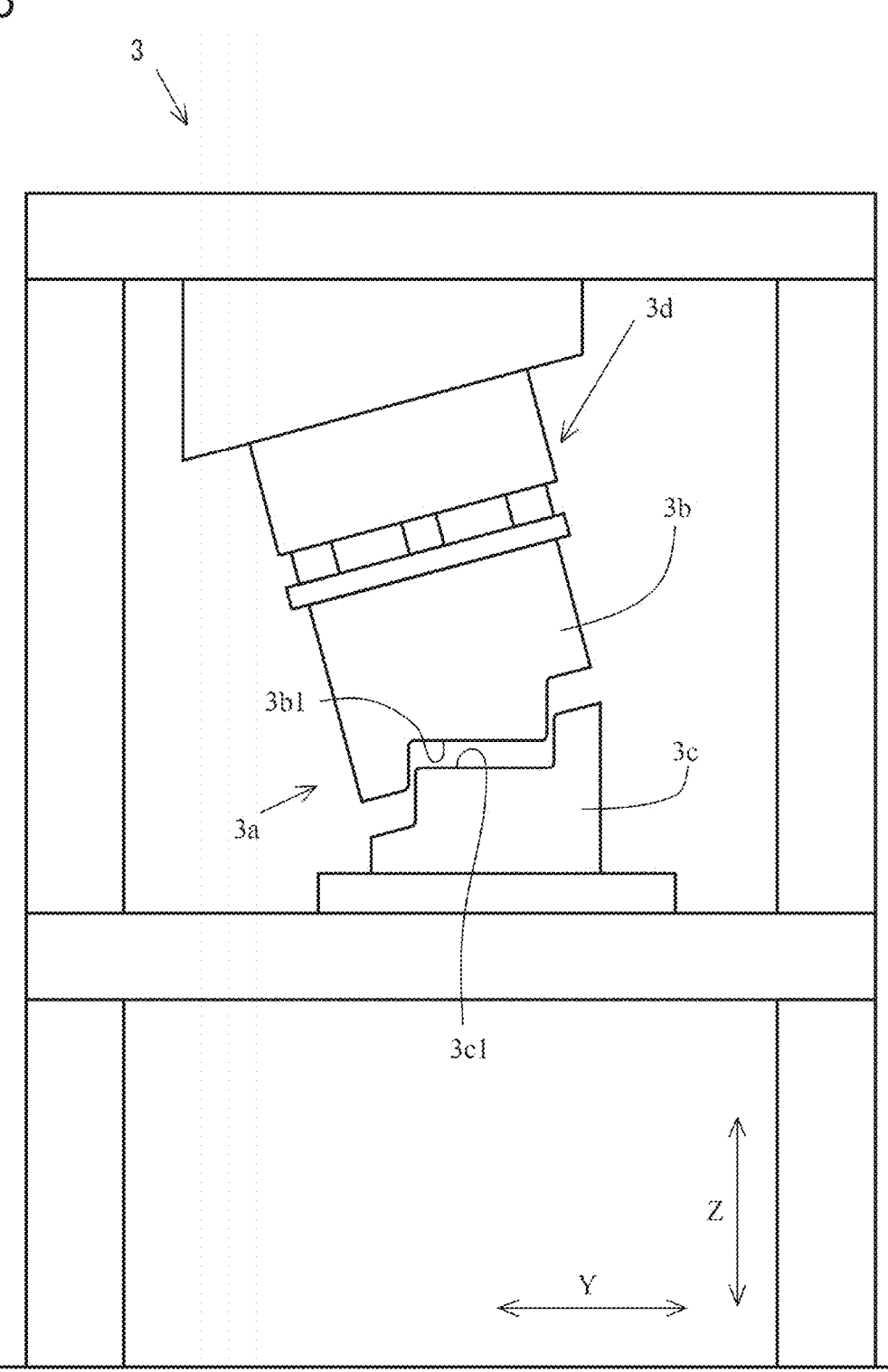
FIG. 3 is a front view of a molding mechanism of the continuous molding machine.

The molding mechanism 3 molds the reinforcing fiber base material R1 into a Z shape as described above. Therefore, as shown in FIG. 3, the molding mechanism 3 includes a molding mold 3a for molding the three sheets of reinforcing fiber base materials R1 in an overlapped state into a Z shape, and the molding mold 3a includes an upper mold 3b and a lower mold 3c.

The upper mold 3b and the lower mold 3c are each formed so that molding surfaces 3b1 and 3c1 for molding the reinforcing fiber base material R1 into the reinforcing fiber material R2 form a Z shape. Specifically, the molding surfaces 3b1 and 3c1 are each formed such that parts on both sides with respect to a middle part are bent at an angle of about 90° to opposite sides to each other. Note that the molding mold 3a is arranged downstream of the supply device 2 so as to vertically sandwich a path of the reinforcing fiber base material R1 with the upper mold 3b and the lower mold 3c. Additionally, the lower mold 3c is fixedly arranged below the path.

In addition, the molding mechanism 3 includes a mold driving device 3d, such as a hydraulic cylinder, for reciprocating the upper mold 3b, and the mold driving device 3d drives the upper mold 3b toward the lower mold 3c, thereby pressurizing the reinforcing fiber base materials R1 with the upper mold 3b and the lower mold 3c. However, the mold driving device 3d is provided in a direction in which a direction of reciprocating the upper mold 3*b* forms an angle with respect to an upper-lower direction Z so that the pressurization on the reinforcing fiber base material R1 is performed not only in the upper-lower direction Z but also in a width direction Y of the path.

In addition, the molding mechanism 3 is configured to heat the upper mold 3*b* and the lower mold 3*c* so that the reinforcing fiber base material R1 is heated simultaneously with the pressurization when performing the pressurization as described above. In addition, the heating temperature is set to a temperature higher than a temperature (deformable temperature) at which the reinforcing fiber base material R1 enters a deformable state. However, the deformable temperature referred to here is a temperature determined corresponding to a type of thermoplastic resin as a matrix material in the reinforcing fiber base material R1 (reinforcing fiber material R2 formed by molding the reinforcing fiber base material R1), and is a temperature at which the thermoplastic resin enters a deformable state at the time when the reinforcing fiber base material R1 (reinforcing fiber material R2) is heated and reaches the temperature. For reference, in the reinforcing fiber base material R1 (thermoplastic resin as a matrix material) of the present embodiment, the deformable temperature is assumed to be 270° C. Additionally, the heating temperature of the molding mold 3*a* (upper mold 3*b* and lower mold 3*c*) of the molding mechanism 3 is set to 280° C.

In the molding mechanism 3 configured as described above, heating and pressurization by the molding mold 3*a* are performed on the three sheets of reinforcing fiber base materials R1 supplied from the supply device 2, so that a straight reinforcing fiber material R2 with a Z-shaped cross-sectional shape is molded. In addition, the reinforcing fiber material R2 molded into a Z shape is conveyed toward the curve shaping apparatus 4 provided downstream of the path with respect to the molding mechanism 3, as shown in FIGS. 1 and 2. Note that the direction in which the reinforcing fiber material R2 is conveyed is straight and is referred to as a conveying direction X. In addition, with respect to the reinforcing fiber base material R1 and the reinforcing fiber material R2, the direction of the path is assumed to be a direction including a direction opposite to the conveying direction X and the conveying direction X. The direction of the path is assumed to be horizontal in the present embodiment.

In the present invention, the curve shaping apparatus 4 includes a heating device that heats the reinforcing fiber material R2 in the path, and a clamping mechanism that clamps the reinforcing fiber material R2 on an upstream side of the heating device. In addition, the curve shaping apparatus 4 includes a swing mechanism that rotationally drives a gripping unit that grips the reinforcing fiber material R2, a shaping mechanism including a shaping mold unit for shaping the reinforcing fiber material R2 into a curved shape at a position adjacent to the heating device, and a pulling-out mechanism that pulls out the reinforcing fiber material R2, respectively, on the downstream side of the heating device. Additionally, the curve shaping apparatus 4 includes a drive control device that controls drive of each mechanism.

Furthermore, as shown in FIGS. 1 and 2, in the present embodiment, it is assumed that the shaping mechanism 13 is configured to also function as the swing mechanism 14 and the pulling-out mechanism 15. In addition, in the present embodiment, it is assumed that a holding mechanism 16 for holding the reinforcing fiber material R2 is provided downstream of the shaping mechanism 13, which also functions as the swing mechanism 14, as a configuration for preventing positional misalignment of the reinforcing fiber material R2. That is, in the present embodiment, the curve shaping apparatus 4 includes the holding mechanism 16. The configuration of the curve shaping apparatus 4 will be described in detail, as follows.

Figure 4:
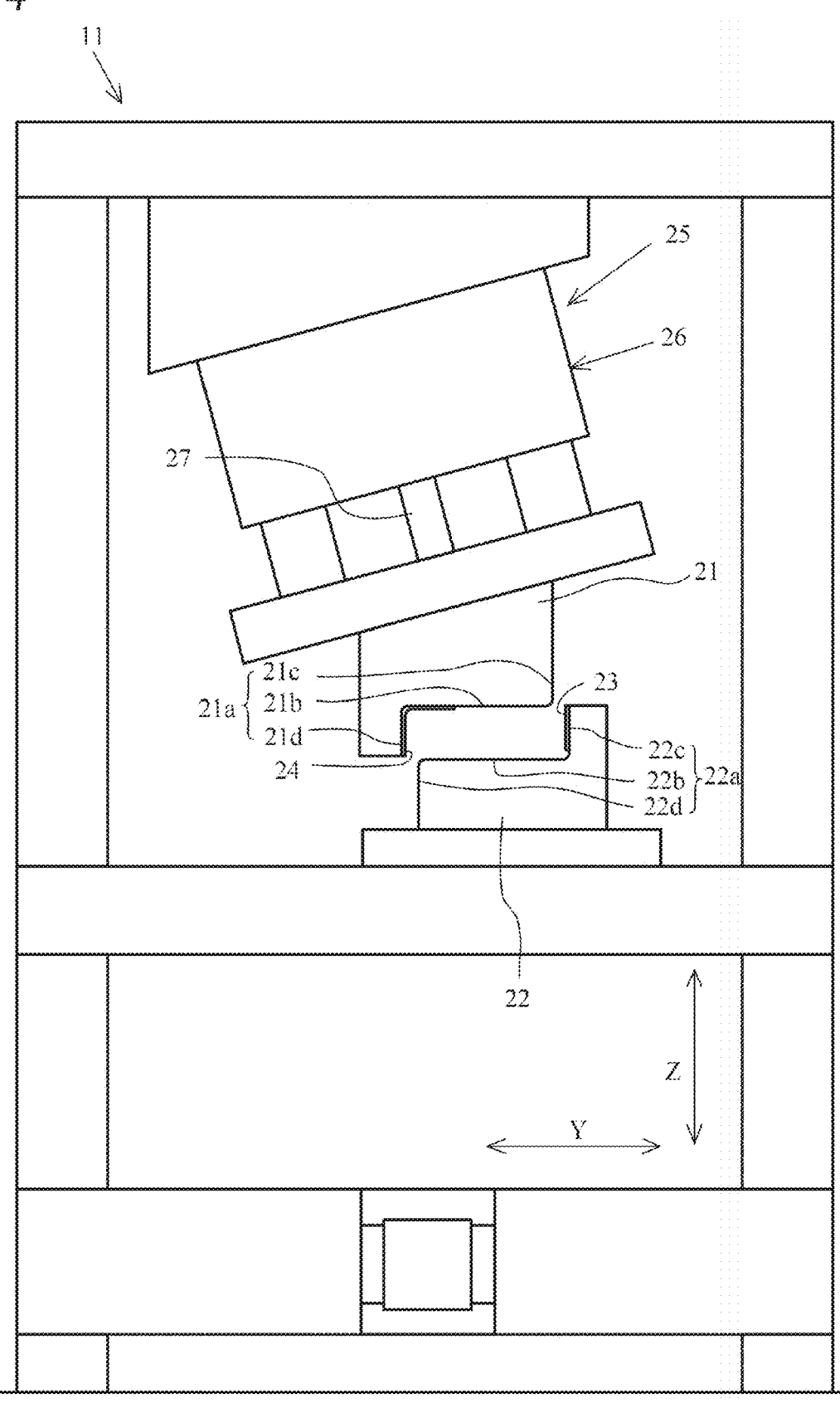
FIG. 4 is a front view of a clamping mechanism in the curve shaping apparatus.

As shown in FIG. 4, the clamping mechanism 11 includes, as a configuration for clamping the reinforcing fiber material R2, a pair of clamping bodies 21 and 22 arranged to vertically sandwich the path and a clamping body driving device 25 that drives one clamping body 21.

The pair of clamping bodies 21 and 22 is formed so that clamping surfaces 21*a* and 22*a* can face the entire surface (upper and lower surfaces) of the reinforcing fiber material R2 molded into a Z shape as described above.

More specifically, the reinforcing fiber material R2 is molded into a Z shape as described above, and as shown in FIG. 8, has a portion on a center side (central portion R3) and portions on both sides (both end portions) with respect to the central portion R3, which are portions on side end sides (side end portions R4 and R5) bent to form an angle of about 90° to opposite sides to each other with respect to the central portion R3.

In contrast, as shown in FIG. 4, the clamping surface 22*a* of the clamping body 22 on the lower side (lower clamping body 22) is composed of a horizontal surface 22*b*, which is a portion facing a lower surface of the central portion R3 in the reinforcing fiber material R2, and two vertical surfaces 22*c* and 22*d* (upper vertical surface 22*c* and lower vertical surface 22*d*), which are portions facing lower surface sides of both side end portions R4 and R5 in the reinforcing fiber material R2 and extending upward and downward, respectively, at an angle of about 90° with respect to the horizontal surface 22*b*. Similarly, the clamping surface 21*a* of the clamping body 21 on the upper side (upper clamping body 21) is composed of a horizontal surface 21*b*, which is a portion facing an upper surface of the central portion R3 in the reinforcing fiber material R2, and two vertical surfaces 21*d* and 21*c* (lower vertical surface 21*d* and upper vertical surface 21*c*), which are portions facing upper surface sides of both the side end portions R4 and R5 in the reinforcing fiber material R2 and extending downward and upward, respectively, at an angle of about 90° with respect to horizontal surface 21*b*.

Furthermore, the lower clamping body 22 is fixedly arranged at a position where a position of the horizontal surface 22*b* of the clamping surface 22*a* coincides with a height position of the path in the upper-lower direction Z. In addition, the upper clamping body 21 is provided so that the horizontal surface 21*b* of the clamping surface 21*a* faces the horizontal surface 22*b* of the clamping surface 22*a* of the lower clamping body 22 in the upper-lower direction Z. However, the upper clamping body 21 is arranged at a position (upper standby position) spaced upward from the lower clamping body 22 during a standby mode in which the reinforcing fiber material R2 is not clamped.

The clamping body driving device 25 is provided to drive the upper clamping body 21 at the upper standby position forward and backward with respect to the lower clamping body 22 so as to clamp the reinforcing fiber material R2 by both the clamping bodies 21 and 22. Note that, in the present embodiment, the clamping body driving device 25 is configured to use a hydraulic cylinder 26 as a driving means. The clamping body driving device 25 attaches the upper clamping body 21 to a piston rod 27 of the hydraulic cylinder 26, thereby supporting the upper clamping body 21 as if the upper clamping body 21 is at the upper standby position during the standby mode.

Furthermore, the clamping body driving device 25 drives the upper clamping body 21 forward and backward between a clamping position where the reinforcing fiber material R2 is clamped and the upper standby position. However, the clamping body driving device 25 is provided to drive the upper clamping body 21 forward and backward in a direction forming an angle with respect to the vertical direction so as to cause a clamping force resulting from an urging force of the hydraulic cylinder 26 to act not only on the central portion R3 but also on both the side end portions R4 and R5 of the reinforcing fiber material R2 molded into a Z shape.

Specifically, the upper standby position of the upper clamping body 21 is displaced with respect to the width direction Y so that the lower vertical surface 21d of the clamping surface 21a of the upper clamping body 21 is positioned outside the lower clamping body 22 with respect to the lower vertical surface 22d of the clamping surface 22a of the lower clamping body 22 (the upper vertical surface 21c of the clamping surface 21a of the upper clamping body 21 is positioned inside the lower clamping body 22 with respect to the upper vertical surface 22c of the clamping surface 22a of the lower clamping body 22). In addition, the hydraulic cylinder 26 is provided so that the advancing direction of the piston rod 27 forms an angle with respect to the vertical direction and is directed toward an opposite direction to the above-described displacement direction of the upper clamping body 21 with respect to the lower clamping body 22 in the width direction Y.

Thereby, the clamping body driving device 25 is provided such that, when driving the upper clamping body 21 to advance toward the lower clamping body 22, it causes the upper clamping body 21 to approach the lower clamping body 22 not only in the vertical direction but also in the width direction Y. Therefore, according to the configuration, the urging force by the hydraulic cylinder 26 acting on the lower clamping body 22 via the upper clamping body 21, i.e., the clamping force by the upper clamping body 21 and the lower clamping body 22, acts not only in the vertical direction but also in the width direction Y.

Furthermore, the clamping mechanism 11 of the present embodiment is configured so that the clamping force acts on a part of the central portion R3 and both the side end portions R4 and R5 of the reinforcing fiber material R2. Specifically, in the clamping mechanism 11, a clamping piece 23 made of a flat plate material is attached to the upper vertical surface 22c of the clamping surface 22a of the lower clamping body 22. In addition, an L-shaped clamping piece 24 formed by bending a plate material into an L shape is attached to the lower vertical surface 21d of the clamping surface 21a of the upper clamping body 21 and to an end portion on the lower vertical surface 21d-side of the horizontal surface 21b. Thereby, the clamping mechanism 11 is adapted to clamp the reinforcing fiber material R2 only within a range where both the clamping pieces 23 and 24 are present.

In addition, the clamping mechanism 11 of the present embodiment is configured to heat both the clamping bodies 21 and 22 so as to heat the reinforcing fiber material R2 in a state in which the reinforcing fiber material R2 is clamped. Note that the purpose of the heating is to shorten the heating time of the reinforcing fiber material R2 by the heating device 12 provided downstream of the clamping mechanism 11. In addition, the heating temperature of both the clamping bodies 21 and 22 is set to a temperature lower than the deformable temperature.

Figure 5:
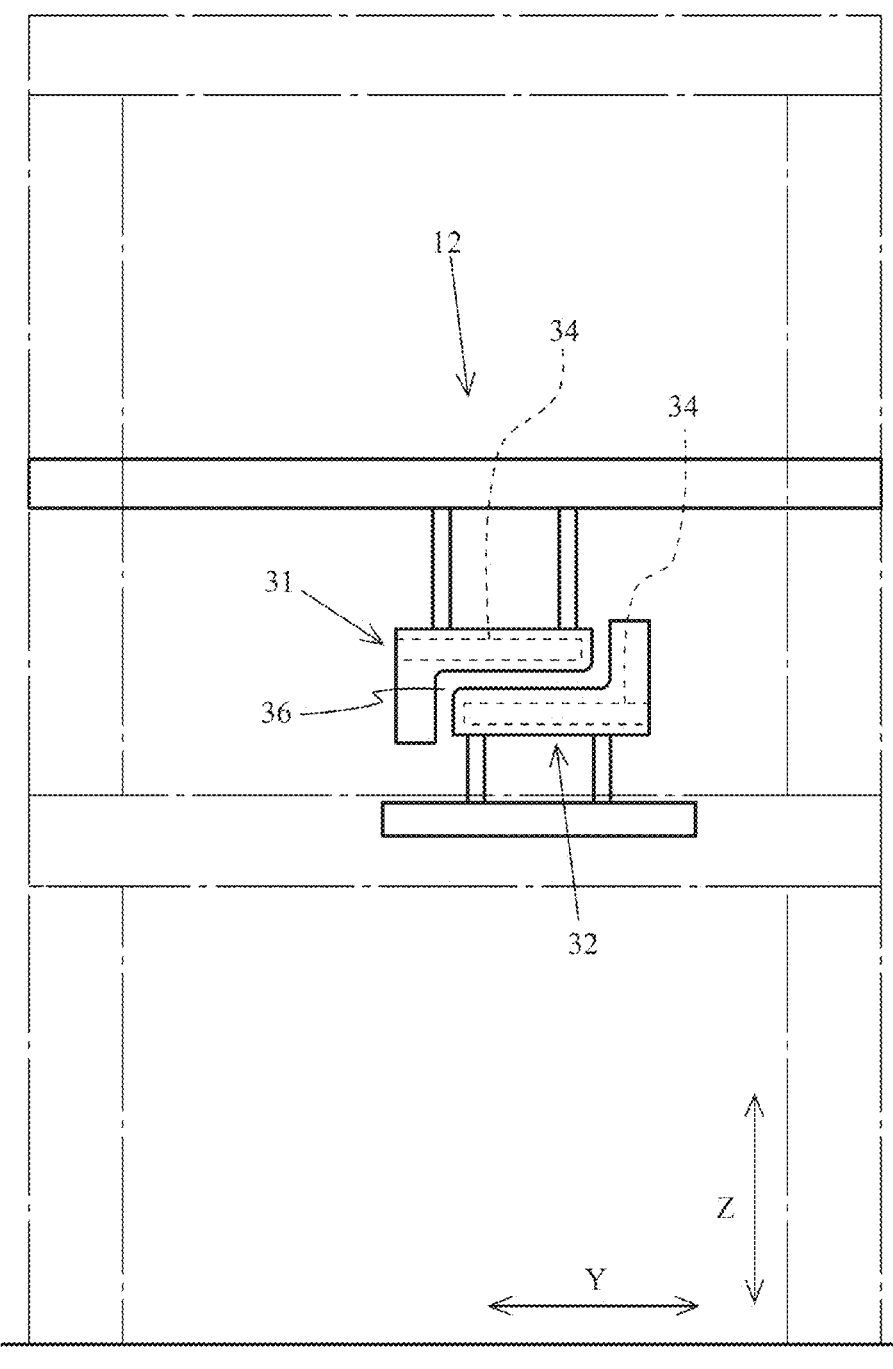
FIG. 5 is a front view of a heating device in the curve shaping apparatus.

As shown in FIG. 5, the heating device 12 includes a pair of heating members 31 and 32 (an upper heating member 31 and a lower heating member 32) fixedly arranged downstream of the clamping mechanism 11 to vertically sandwich the path. More specifically, both the heating members 31 and 32 are mainly composed of block-shaped members with an L-shaped cross section. Both the heating members 31 and 32 are configured to have built-in heaters 34. Furthermore, both the heating members 31 and 32 are provided to have such a positional relationship that each inner surface faces the other heating member 32, 31 and is spaced apart from the other heating member 32, 31 so as to form a Z-shaped space 36 between both the heating members when viewed in a direction orthogonal to an L-shaped end surface.

In this case, the interval between both the heating members 31 and 32 is substantially uniform throughout a range where both the heating members 31 and 32 face each other, and is slightly larger than a thickness of the reinforcing fiber material R2. In addition, both the heating members 31 and 32 are formed to have such a size that a width of the Z-shaped space 36 when viewed in the above-described orthogonal direction is slightly larger than a width of the reinforcing fiber material R2 molded into a Z shape as described above (a size between the side end portions R4 and R5 on both sides). That is, both the heating members 31 and 32 are members whose size allows the Z-shaped space 36 formed by both the heating members to pass the Z-shaped reinforcing fiber material R2.

Both the heating members 31 and 32 are fixedly provided downstream of the clamping mechanism 11 with respect to the direction of the above-described path in such an arrangement that the Z-shaped reinforcing fiber material R2 conveyed on the path can pass through the Z-shaped space 36 formed by both the heating members 31 and 32 without coming into contact with both the heating members 31 and 32 with respect to the upper-lower direction Z and the width direction Y. Both the heating members 31 and 32 are provided in this way, so that the set of the upper and lower heating members 31 and 32 can face the entire surface of the reinforcing fiber material R2 passing through the Z-shaped space 36, on the inner surfaces forming the Z-shaped space 36.

Furthermore, both the heating members 31 and 32 are heated to a predetermined temperature (heating temperature) by the built-in heaters 34. Note that, as the heating members 31 and 32 are heated in this way and generate heat, the reinforcing fiber material R2 passing through the Z-shaped space 36 is heated corresponding to the temperature of the heating members 31 and 32. In addition, since the set of the heating members 31 and 32 is adapted to face the entire surface of the reinforcing fiber material R2 as described above, the reinforcing fiber material R2 (uniformly) receives the heat emitted by the heating members 31 and 32 over the entire surface thereof and is heated. In addition, the heating is performed so as to realize the shaping or the like of the reinforcing fiber material R2 using the shaping mechanism 13, which will be described below. Therefore, the heating temperature of both the heating members 31 and 32 becomes a temperature higher than the deformable temperature.

In addition, as for the heating temperature, a portion of the reinforcing fiber material R2 is heated by the heating device 12, and then the heated portion is conveyed to the shaping mechanism 13 located on the downstream side where it is shaped. However, since there is a time difference between a time point when heating is performed and a time point when shaping is performed, the temperature of the heated portion at the time of shaping may be lower than the temperature at the time of heating by the heating device 12. In addition, since the heating device 12 (heating members) heats the reinforcing fiber material R2 by applying heat to the surface, the temperature is different between a surface portion and a central portion in the heated portion. Therefore, the heating temperature of both the heating members 31 and 32 is sufficiently higher than the deformable temperature, and the temperature at which the heating member is heated by the heater 34 is set accordingly. For reference, in the present embodiment, the heating temperature of both the heating members 31 and 32 is 360° C.

Figure 6:
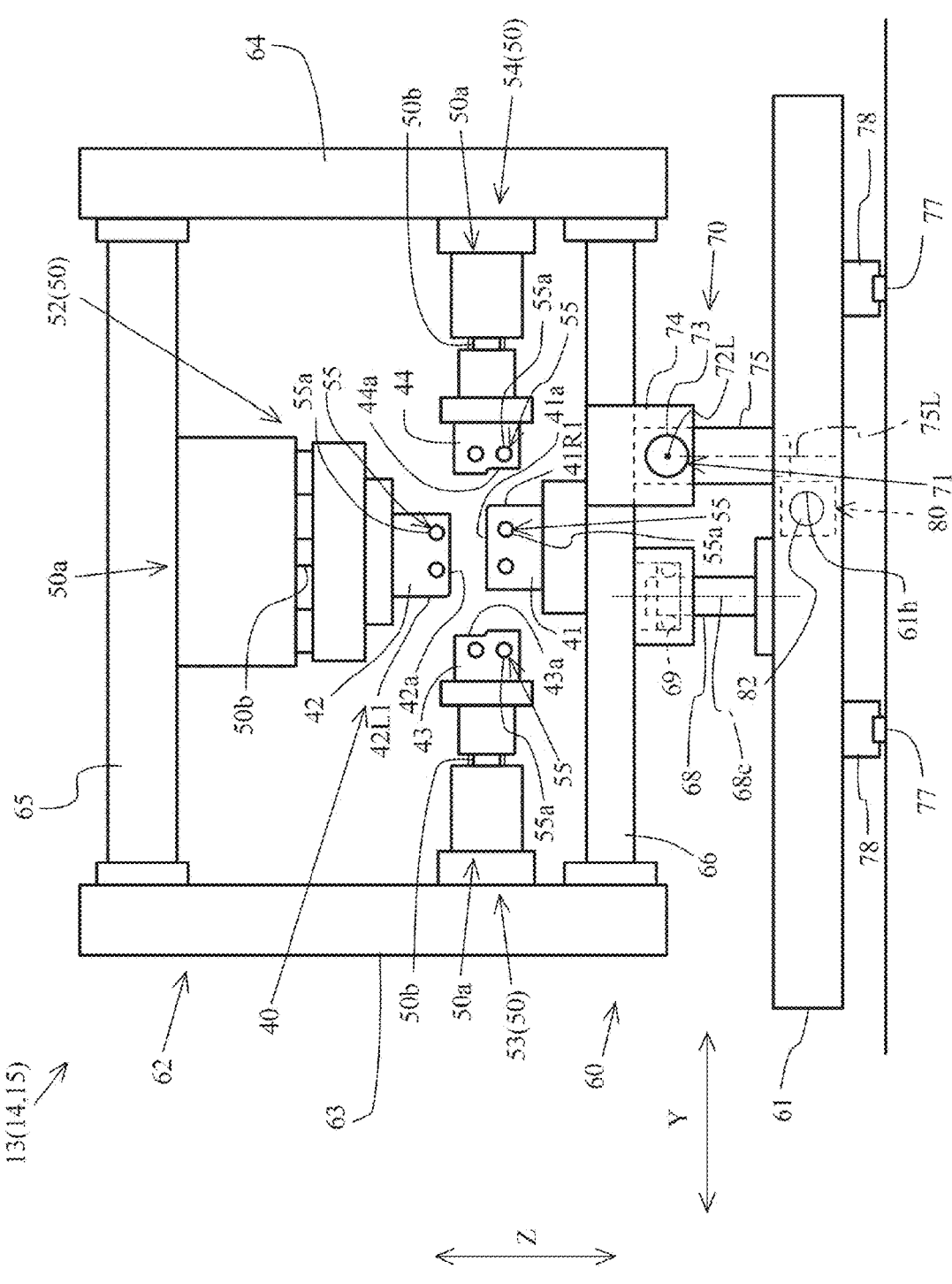
FIG. 6 is a rear view of a shaping mechanism in the curve shaping apparatus.

As shown in FIG. 6, the shaping mechanism 13 includes, as a configuration for shaping the reinforcing fiber material R2 into a curved shape, a shaping mold unit 40 provided adjacent to the heating device 12 on the downstream side of the heating device 12, a mold driving device 50 that drives the shaping mold unit 40, and a mold heating device 55 that heats the shaping mold unit 40.

The shaping mold unit 40 includes a lower mold 41 arranged below the path, an upper mold 42 arranged above the path, and a pair of side molds 43 and 44 arranged on both sides of the lower mold 41 and the upper mold 42 in the width direction Y. Note that, as for the shaping of the reinforcing fiber material R2 by the shaping mold unit 40, the shaping is to impart a newer shape (a curved shape in the present invention) to the reinforcing fiber material R2 previously molded into a predetermined shape (Z shape in the present embodiment), and in other words, is to apply further deformation to the molded reinforcing fiber material R2 by the shaping mold unit 40. In addition, the shaping is performed by pressurizing the reinforcing fiber material R2 with the mold (lower mold 41, upper mold 42, and a pair of side molds 43 and 44) provided to the shaping mold unit 40.

Since the molded reinforcing fiber material R2 has a Z shape as described above, the side end portion R4 (upper side end portion R4), which is one of both the side end portions R4 and R5 of the reinforcing fiber material R2 and is located above the path, is shaped by one of both the side molds 43 and 44 (the left side mold 43 in FIG. 6 viewed from downstream) and the upper mold 42. Similarly, the side end portion R5 (lower side end portion R5), which is the other of both the side end portions R4 and R5 of the reinforcing fiber material R2 and is located below the path, is shaped by the other of both the side molds 43 and 44 (the right side mold 44 in FIG. 6 viewed from downstream) and the lower mold 41. Therefore, in the shaping mold unit 40, a surface of the upper mold 42 facing the lower mold 41 and the left side mold 43 is used as a shaping surface 42a, and a surface of the lower mold 41 facing the upper mold 42 and the right side mold 44 is used as a shaping surface 41a. In addition, in the left side mold 43, a portion of a surface facing the upper mold 42 and the lower mold 41, which faces the upper mold 42, is used as a shaping surface 43a, and in the right side mold 44, a portion of a surface facing the upper mold 42 and the lower mold 41, which faces the lower mold 41, is used as a shaping surface 44a.

Figure 8:
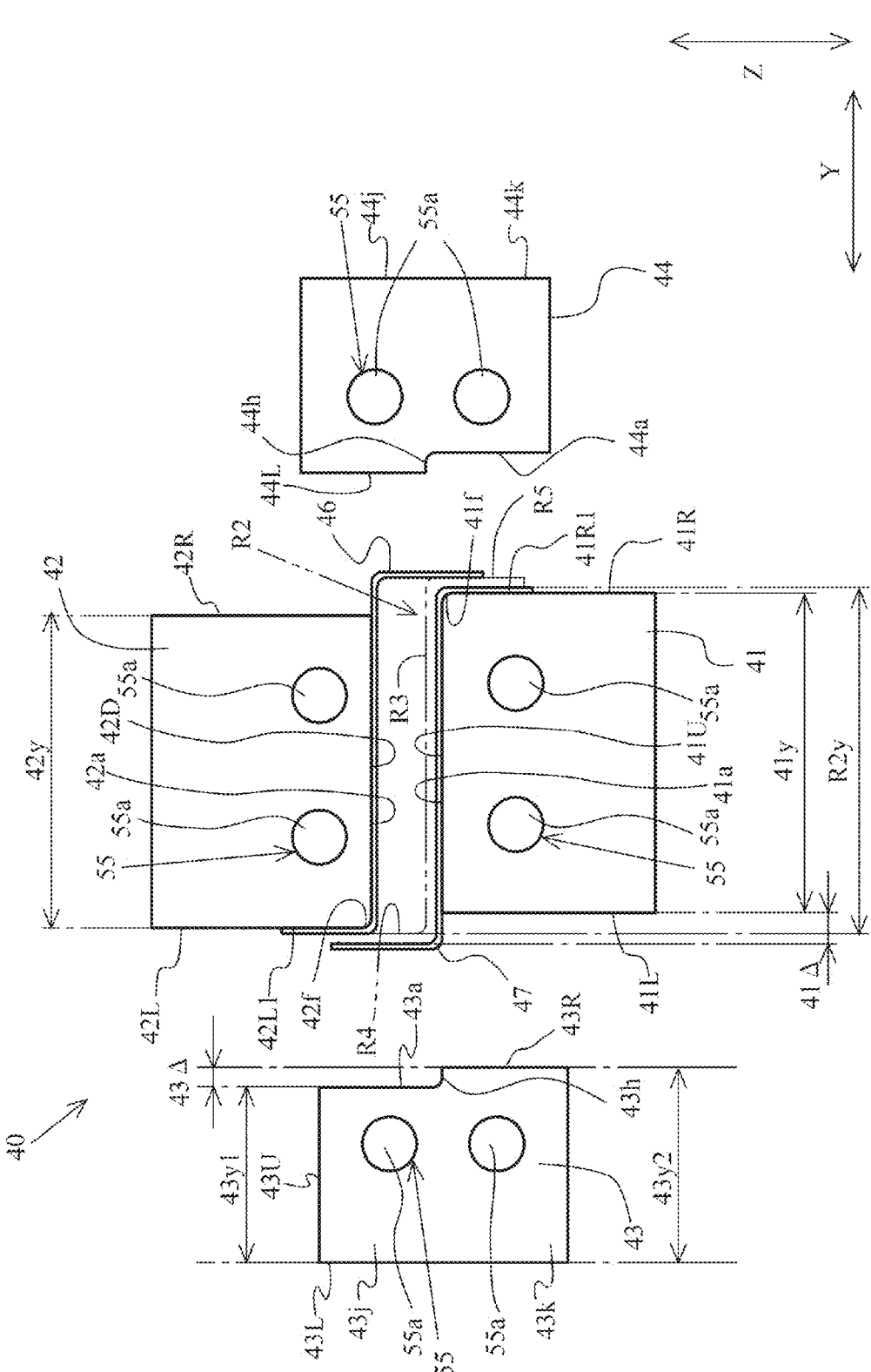
FIG. 8 is a simple rear view of a shaping mold unit in the shaping mechanism.

Each of the molds 41 to 44 in the shaping mold unit 40 is composed of a block-shaped member forming a substantially rectangular parallelepiped. In addition, the arrangement of each of the molds 41 to 44 is as shown in FIG. 8, and is described, as follows. Note that, for easy understanding of the configuration of the shaping mold unit 40, only the rear surface of the shaping mold unit 40 is shown in FIG. 8.

The lower mold 41 is arranged at a position where a position of an upper surface 41U substantially coincides with a height position of the path, with respect to the upper-lower direction Z. In addition, the lower mold 41 has a side surface oriented parallel to the direction of the path and is arranged at a position where a position of one side surface 41R (the right side surface 41R) substantially coincides with a position of an inner surface of the lower side end portion R5 in the reinforcing fiber material R2 passing on the path, with respect to the width direction Y. The lower mold 41 is fixedly provided at such a position. In this way, the arrangement of the lower mold 41 is such that, with respect to the reinforcing fiber material R2 passing on the path, the lower mold 41 can face the central portion R3 closely on the upper surface 41U and face the lower side end portion R5 closely on the right side surface 41R.

In addition, the lower mold 41 is formed such that a dimension 41y in the width direction Y in such an arrangement state is slightly smaller than an interval R2y between the inner surfaces of both the side end portions R4 and R5 in the reinforcing fiber material R2. Thereby, the side surface 41L (left side surface 41L) on the opposite side to the right side surface 41R in the lower mold 41 is located on a slight inner side with respect to the inner surface of the upper side end portion R4 in the reinforcing fiber material R2 in the width direction Y.

The upper mold 42 is arranged so that a lower surface faces the lower mold 41 in an orientation in which the side surfaces 42R and 42L are parallel to the direction of the path. However, the arrangement of the upper mold 42 in the width direction Y is such that a position of one side surface 42L (the left side surface 42L) substantially coincides with a position of the inner surface of the upper side end portion R4 of the reinforcing fiber material R2 passing on the path. In this way, the arrangement of the upper mold 42 is such that, with respect to the reinforcing fiber material R2 passing on the path, the upper mold 42 can face the central portion R3 on the lower surface 42D and face the upper side end portion R4 closely on the left side surface 42L.

However, the upper mold 42 is arranged at a position (upper mold standby position) spaced upward from the lower mold 41 during a standby mode in which the reinforcing fiber material R2 is not shaped (during non-shaping). In addition, the upper mold standby position is a position where the lower surface 42D of the upper mold 42 is located slightly below an upper end edge of the upper side end portion R4 in the reinforcing fiber material R2 passing on the path. Therefore, the arrangement of the upper mold 42 is such that even when the upper mold 42 is located at the upper mold standby position, the upper mold can face the upper side end portion R4 of the reinforcing fiber material R2 passing on the path closely on the left side surface 42L.

Note that a dimension 42y in the width direction Y of the upper mold 42 in such an arrangement state is the same as the dimension 41y in the width direction Y of the lower mold 41 and is slightly smaller than an interval R2y between the inner surfaces of both the side end portions R4 and R5 in the reinforcing fiber material R2. Thereby, the side surface (the right side surface 42R) on the opposite side to the left side surface 42L in the upper mold 42 is located on a slight inner side with respect to the inner surface of the lower side end portion R5 in the reinforcing fiber material R2 in the width direction Y.

In this way, in the shaping mold unit 40 of the present embodiment, the upper mold 42 and the lower mold 41 have the same dimensions 42y and 41y in the width direction Y, are provided so that the left and right side surfaces 41L, 41R, 42L, and 42R are positioned as described above, and are provided in a state of being positionally misaligned in the width direction Y as a whole. As a result, the shaping mold unit 40 is in a state in which a portion continuous with the right side surface 41R of the upper mold 41U of the lower mold 41 is exposed with respect to the upper mold 42 when viewed from vertically above (the right side surface 42R of the upper mold 42 is located on an inner side with respect to the right side surface 41R of the lower mold 41). Note that a corner portion 41*f* between the right side surface 41R and the upper surface 41U in the lower mold 41 is chamfered (R-chamfered) into a circular arc shape. Similarly, the shaping mold unit 40 is in a state in which a portion continuous with the left side surface 42L of the lower surface 42D of the upper mold 42 is exposed with respect to the lower mold 41 when viewed from vertically below (the left side surface 41L of the lower mold 41 is located on an inner side with respect to the left side surface 42L of the upper mold 42). Note that a corner portion 42*f* between the left side surface 42L and the lower face 42D in the upper mold 42 is also R-chamfered, like the corner portion 41*f* of the lower mold 41.

The left side mold 43 is arranged at a position (left side mold standby position) spaced leftward from the upper mold 42 and the lower mold 41 on the left side with respect to the upper mold 42 and the lower mold 41, in the width direction Y, during the non-shaping. In addition, the left side mold 43 is arranged at a position where substantially a central portion substantially coincides with the position of the upper surface 41U of the lower mold 41, with respect to the upper-lower direction Z. Additionally, the left side mold 43 is provided in a direction in which the side surfaces 43R and 43L are parallel to the left side surface 42L of the upper mold 42. In addition, the left side mold 43 is formed so that the side surface 43L on an opposite side to the side surface 43R (the right side surface, hereinafter referred to as "facing surface 43R") facing the upper mold 42 and the lower mold 41 is flat. Furthermore, the left side mold 43 is formed so that a dimension 43*y*2 in the width direction Y of a portion 43*k* (lower portion 43*k*) facing the lower type 41 is greater than a dimension 43*y*1 in the width direction Y of a portion 43*j* (upper portion 43*j*) above the lower portion 43*k*. As a result, the facing surface 43R of the left side mold 43 is formed so that a step portion 43*h* is present between the lower portion 43*k* and the upper portion 43*j*.

Note that a dimension difference 434 (size of the step portion 43*h*) in the width direction Y between the upper portion 43*j* and the lower portion 43*k* is slightly smaller than an interval 41Δ in the width direction Y between the outer surface of the upper side end portion R4 in the reinforcing fiber material R2 passing on the path and the left side surface 41L of the lower mold 41. Additionally, a surface on the upper portion 43*j* side of the facing surface 43R is formed so that a portion continuous with a surface on the lower portion 43*k* side is a circular arc surface. However, a radius of curvature of the circular arc surface is slightly greater than a radius of curvature of the R surface of the corner portion 42*f* in the upper mold 42.

In addition, in the state arranged as above, in the upper-lower direction Z, the left side mold 43 has such a size that the position of the upper surface 43U is located slightly above the upper side end portion R4 of the reinforcing fiber material R2 passing on the path. Thereby, the arrangement of the left side mold 43 is such that it can face the entire outer surface of the upper side end portion R4 of the reinforcing fiber material R2 at the upper portion 43*j*.

The right side mold 44 itself has the same shape (size) as the left side mold 43, and is arranged symmetrically to the left side mold 43 with respect to the upper mold 42 and the lower mold 41 in the direction in which the top and bottom are reversed. Therefore, the right side mold 44 also faces the upper mold 42 and the lower mold 41 on a facing surface 44L having a step portion 44*h*. In addition, with respect to the dimension in the width direction Y of the right side mold 44, an upper portion 44*j* is larger than a lower portion 44*k*. However, regarding the arrangement in the upper-lower direction Z, a position of a boundary between the upper portion 44*j* and the lower portion 44*k* substantially coincides with the position of the upper surface of the central portion R3 of the reinforcing fiber material R2 passing on the path. The right side mold 44 is also arranged at a position (right side mold standby position) spaced rightward from the upper mold 42 and the lower mold 41 with respect to the width direction Y during the non-shaping. In addition, the arrangement of the right side mold 44 is also such that it can face the entire outer surface of the lower side end portion R5 of the reinforcing fiber material R2 passing on the path at the lower portion 44*k*.

As shown in FIG. 6, the mold driving device 50 is provided for each of the molds 42 to 44 so as to individually drive the upper mold 42 and both the side molds 43 and 44 (the left side mold 43 and the right side mold 44) in the shaping mold unit 40 forward and backward for shaping the Z-shaped reinforcing fiber material R2 by the shaping mold unit 40. Note that in the present embodiment, each mold driving device 50 is configured to use a hydraulic cylinder 50*a* as a driving means. The respective mold driving devices 50 support the corresponding molds 42 to 44 by attaching the corresponding molds 42 to 44 to piston rods 50*b* of the hydraulic cylinders 50*a*.

Furthermore, the mold driving device 50 (upper mold driving device 52) supporting the upper mold 42 is provided to drive the upper mold 42 forward and backward in the vertical direction between the upper mold standby position and a position (upper pressurization position), at which the central portion R3 in the reinforcing fiber material R2 passing on the path is pressurized in cooperation with the lower mold 41, with respect to the upper-lower direction Z. In addition, the mold driving device 50 (left side mold driving device 53) supporting the left side mold 43 is provided to drive the left side mold 43 forward and backward in the horizontal direction between the left side mold standby position and a position (left pressurization position), at which the upper side end portion R4 in the reinforcing fiber material R2 passing on the path is pressurized in cooperation with the upper mold 42, with respect to the width direction Y. In addition, the mold driving device 50 (right side mold driving device 54) supporting the right side mold 44 is provided to drive the right side mold 44 forward and backward in the horizontal direction between the right side mold standby position and a position (right pressurization position), at which the lower side end portion R5 in the reinforcing fiber material R2 passing on the path is pressurized in cooperation with the lower mold 41, with respect to the width direction Y.

Note that each pressurization position is set as a position for each mold (lower mold 41, upper mold 42 and both side molds 43 and 44) for pressurizing the reinforcing fiber material R2 in cooperation, taking into consideration the thickness of the reinforcing fiber material R2, the pressurizing force to be applied to the reinforcing fiber material R2, and the like. In the shaping mechanism 13, each mold (upper mold 42, both side molds 43 and 44) in the shaping mold unit 40 is driven to advance toward each pressurization position by each mold driving device 50 as described above, and the reinforcing fiber material R2 is pressurized by the cooperation of each mold (lower mold 41, upper mold 42, and both side molds 43 and 44), resulting in shaping the reinforcing fiber material R2. Therefore, in each of the molds 41 to 44 (lower mold 41, upper mold 42, and both side molds 43 and 44), the surfaces contributing to the shaping become shaping surfaces 41a to 44a.

Specifically, in the lower mold 41, the upper surface 41U and the right side surface 41R (more specifically, the portion of the right side surface 41R facing the right side mold 44) are the shaping surface 41a, and in the upper mold 42, the lower surface 42D and the left side surface 42L (more specifically, the portion of the left side surface 42L facing the left side mold 43 at the upper pressurization position) is the shaping surface 42a. In addition, in the left side mold 43, the portion on the upper portion 43j side of the facing surface 43R is the shaping surface 43a, and in the right side mold 44, the portion on the lower portion 44k side of the facing surface 44L is the shaping surface 44a.

Note that, as for the shaping by pressurizing the reinforcing fiber material R2 by the cooperation of the respective molds 41 to 44, in the shaping mechanism 13 of the present embodiment, since the upper mold 42 and the lower mold 41 are provided in a state of being positionally misaligned in the width direction Y and the side molds 43 and 44 are driven to perform pressurization only in the horizontal direction, the reinforcing fiber material R2 is not directly pressurized by the respective molds on the exposed portions of the upper mold 42 and the lower mold 41 therebetween. Therefore, as shown in FIGS. 8 and 9, in the shaping mechanism 13 of the present embodiment, plates 46 and 47 for pressurization are respectively attached to the upper mold 42 and the lower mold 41 so that the pressurizing force also acts on the exposed portions.

The plates 46 and 47 are formed of flexible plates. In addition, the plates 46 and 47 are each formed into a Z shape whose cross-sectional shape and size are substantially the same as those of the reinforcing fiber material R2, so as to follow the surface of the Z-shaped reinforcing fiber material R2. Furthermore, the plate 46 (upper plate 46) attached to the upper mold 42 is attached to the shaping surface 42a of the upper mold 42 in such a form that a central portion is in contact with the lower surface 42D of the upper mold 42 and one side end-side portion on one side (left side) of both side end sides is in contact with the left side surface 42L of the upper mold 42. In addition, the plate 47 (lower plate 47) attached to the lower mold 41 is attached to the shaping surface 41a of the lower mold 42 in such a form that a central portion is in contact with the upper surface 41U of the lower mold 41 and one side end-side portion on one side (right side) of both side end sides is in contact with the right side surface 41R of the lower mold 41.

Note that the plates 46 and 47 are attached to the molds so that dimensions in the direction of the path are the same as the dimensions of the corresponding molds 42 and 41 in the direction of the path and central positions of the plates with respect to the direction of the path coincide with the central positions of the corresponding molds. In addition, the respective plates 46 and 47 are configured to be able to face the entire central portion R3 of the reinforcing fiber material R2 at the central portions thereof, making it possible to apply the pressurizing force to the reinforcing fiber material R2 at the exposed portions of the upper mold 42 and the lower mold 41 therebetween at the time of pressurizing the reinforcing fiber material R2 by the upper mold 42 and the lower mold 41.

Figure 9:
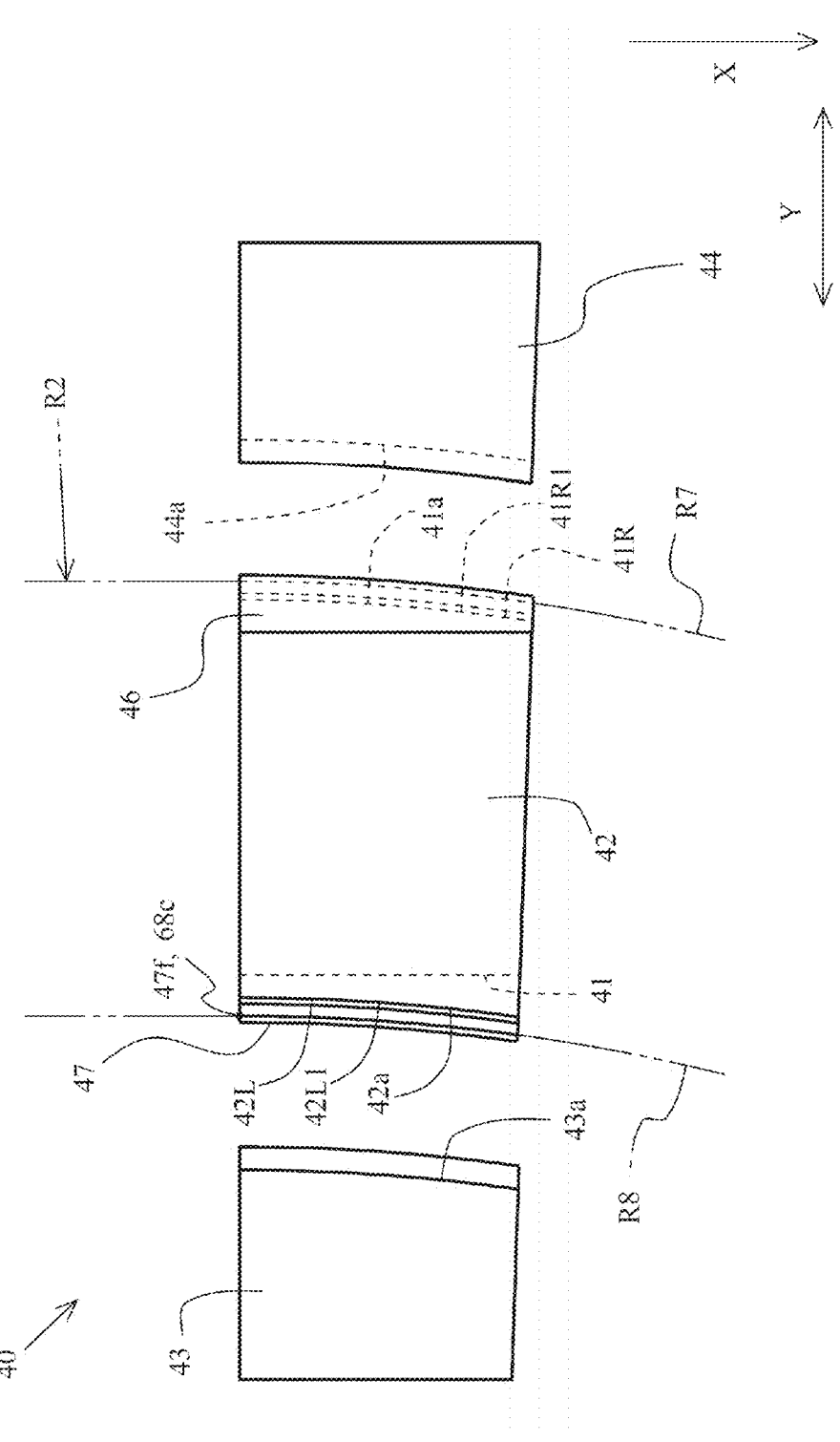
FIG. 9 is a plan view of the shaping mold unit.

In addition, as shown in FIG. 9, the shaping mechanism 13 is to shape the reinforcing fiber material R2 so as to form a curved shape in a plan view, as described above. Therefore, the shaping surfaces 41a to 44a of the respective molds 41 to 44 in the shaping mold unit 40 are formed as curved surfaces for realizing such curve shaping. Note that, in the present embodiment, it is assumed that the reinforcing fiber material R2 with a curved shape to be obtained by the shaping is formed so that an edge (outer side edge R7), which is on an outer side with respect to an arc center (center of a curve) of a circular arc-shaped curve, has a curved shape forming a predetermined desired curvature, and the outer side edge R7 and an edge on an inner side (inner side edge R8) are parallel.

Therefore, the shaping surface 42a of the upper mold 42 (more specifically, the left side surface 42L of the shaping surface 42a) is formed as a circular arc surface curved to the desired curvature so as to realize such a shaping. However, the curved shape is such that the position of the surface becomes outward on the downstream side with respect to the conveying direction X due to a relationship between the conveying direction X, which is the conveying direction of the reinforcing fiber material R2, and the curve shaping. In addition, the shaping surface 41a of the lower mold 41 (more specifically, the right side surface 41R of the shaping surface 41a) is formed as a circular arc surface curved parallel to the shaping surface 42a (left side surface 42L) of the upper mold 42 when viewed in the vertical direction. In addition, the shaping surfaces 43a and 44a of the respective side molds are also formed as circular arc surfaces curved parallel to the shaping surface 42a (left side surface 42L) of the upper mold 42 when viewed in the vertical direction.

Note that the shaping surfaces 43a and 44a of the respective side molds 43 and 44 correspond to the "outer shaping surfaces" referred to in the present invention. In addition, the portion 42L1 of the shaping surface 42a of the upper mold 42, which faces the outer shaping surface 43a of the left side mold 43, and the portion 41R1 of the shaping surface 41a of the lower mold 41, which faces the outer shaping surface 44a of the right side mold 44, correspond to the "inner shaping surfaces" referred to in the present invention. In addition, as described above, each of the plates 46 and 47 attached to the upper mold 42 and the lower mold 41 is also formed to have a curved shape following the shape of the shaping surfaces 42a and 41a of the respective molds 42 and 41 to which the plates 46 and 47 are attached.

As shown in FIGS. 6 and 8, the mold heating device 55 is configured to include a heater 55a built into each of the molds 41 to 44 in the shaping mold unit 40 so as to heat each of the molds 41 to 44. Note that, as for the heating of each of the molds 41 to 44, if the temperature of each of the molds 41 to 44 is low, the temperature of the heated portion (portion heated to a higher temperature than the deformable temperature by the heating device 12) in the reinforcing fiber material R2 may become accordingly lower than the deformable temperature before the shaping is completed, making it impossible to perform the desired shaping. Therefore, the respective molds 41 to 44 are heated so that the temperature of the heated portion in the reinforcing fiber material R2 does not become lower than the deformable temperature before the shaping is completed. For reference, in the present embodiment, the heating temperature is set to 220° C. while the deformable temperature is 270° C.

Figure 7:
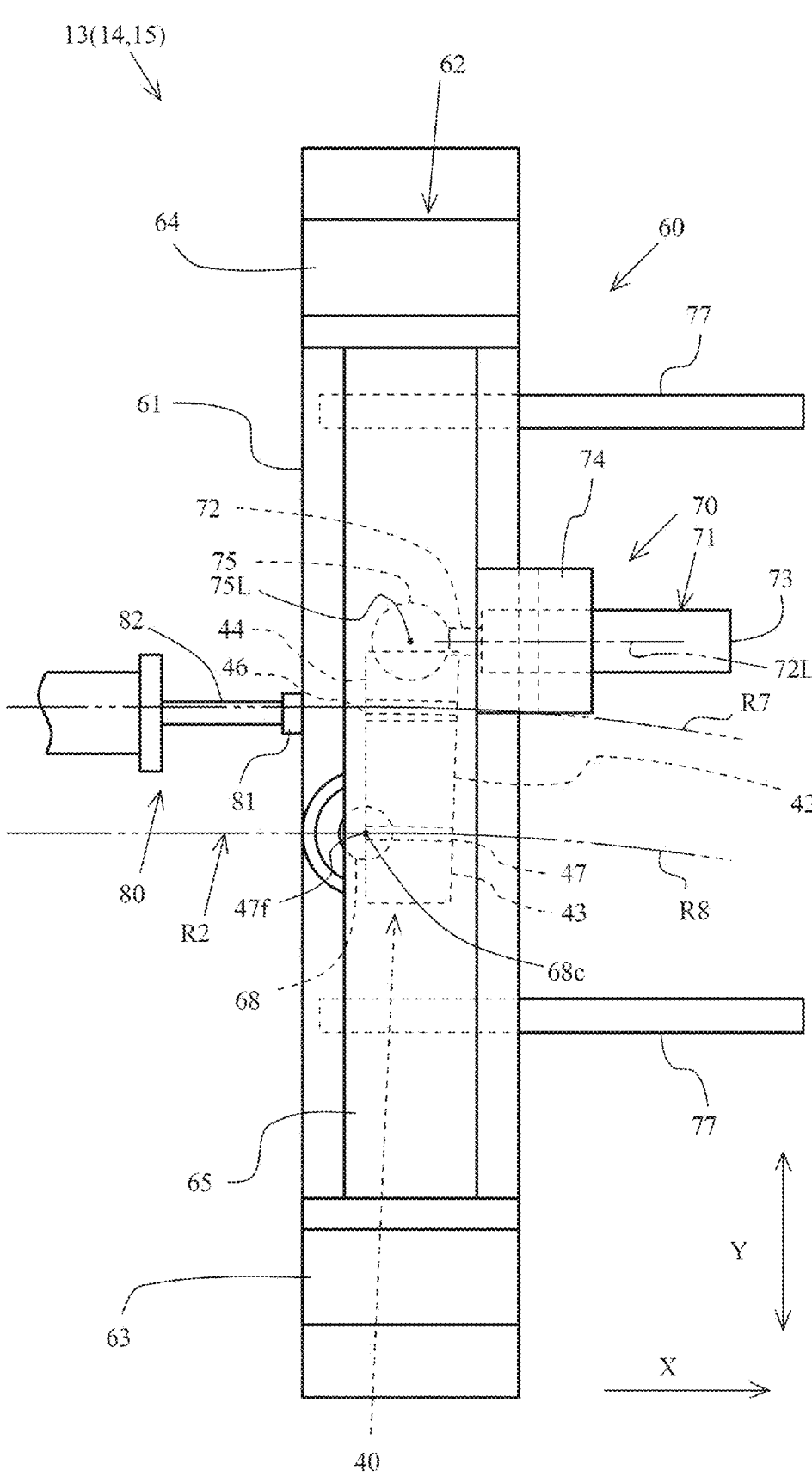
FIG. 7 is a plan view of the shaping mechanism.

Additionally, as shown in FIGS. 6 and 7, the shaping mechanism 13 of the present embodiment also functions as the swing mechanism 14 as described above. For this reason, the shaping mechanism 13 includes a swing drive unit 60 that rotationally drives the shaping mold unit 40. The swing drive unit 60 includes a base 61, a frame 62 supporting the lower mold 41 in the shaping mold unit 40 and each mold driving device, a pillar 68 supporting the frame 62 with respect to the base 61, and a rotation driving device 70 that rotationally drives the frame 62.

The base 61 is a member having a thick plate shape, in which long sides of a rectangular end surface serving as an upper surface are sufficiently large relative to short sides. The base 61 is installed in a direction in which the long side direction on the upper surface coincides with the width direction Y. Additionally, the pillar 68 is a cylindrical member. The pillar 68 is erected with respect to the base 61.

Additionally, the frame 62 is configured as a rectangular frame body combining four prismatic members. Specifically, the frame 62 includes a pair of left and right prismatic side stays 63 and 64 (left side stay 63 and right side stay 64) facing each other in parallel, and a pair of upper and lower prismatic support beams 65 and 66 (upper support beam 65 and lower support beam 66) bridged between both the side stays 63 and 64. The lower mold 41 in the shaping mold unit 40 and each mold driving device 50 (52 to 54) are attached and supported on the frame 62 as described above. More specifically, the lower mold 41 in the shaping mold unit 40 is attached to the lower support beam 66 in the form of being placed. In addition, the upper mold driving device 52 is attached to the upper support beam 65 in a hanging form. Further, the left side mold driving device 53 is attached to the left side stay 63, and the right side mold driving device 54 is attached to the right side stay 64, with the piston rod 50*b* of the hydraulic cylinder 50*a* in each driving device facing in the horizontal direction (inward).

Furthermore, the frame 62 is rotatably attached to the pillar 68 on the lower support beam 66. Specifically, the frame 62 is rotatably attached to an upper end of the pillar 68 via a bearing 69 or the like at a position where, when viewed in a plan view, a position of a left corner portion 47*f* of two corner portions on the upstream side of the lower plate 47 attached to the lower mold 41 on the lower support beam 66 substantially coincides with a center 68*c* of the pillar 68.

In addition, the swing driving device 70 includes a hydraulic cylinder 71 as a driving means and a receiving portion 75 that receives advance and retreat of a piston rod 72 in the hydraulic cylinder 71.

The hydraulic cylinder 71 is attached to the lower support beam 66 of the frame 62 in such a form that the piston rod 72 is directed upstream with respect to the conveying direction X. Specifically, the hydraulic cylinder 71 is attached to a side surface of the lower support beam 66 of the frame 62, which faces toward a downstream side, via a bracket 74 in a cylinder body 73. However, the position at which the hydraulic cylinder 71 is attached is a position on the right side of the support beam 68 with respect to the width direction Y, and is a position on a lower side of the lower support beam 66 of the frame 62 with respect to the upper-lower direction Z. In addition, the hydraulic cylinder 71, in the state of being attached to the frame 62 as described above, is provided such that the piston rod 72 is substantially parallel to the conveying direction X and a tip of the piston rod 72 is directed upstream.

In addition, the receiving portion 75 is a cylindrical member and is rotatably erected with respect to the base 61 between the base 61 and the lower support beam 66 of the frame 62 supported with respect to the base 61 via the pillar 68 as described above. In addition, the position at which the receiving portion 75 is provided is a position where a position of an axis line 75L substantially coincides with a shaft center 72L of the piston rod 72 in the hydraulic cylinder 71 with respect to the width direction Y, and is a position where the tip of the piston rod 72 in the most retreated state in the hydraulic cylinder 71 with respect to the conveying direction can contact a circumferential surface of the receiving portion in a state in which a longitudinal direction of the support beams 65 and 66 in the frame 62 substantially coincides with the width direction Y.

Furthermore, the hydraulic cylinder 71 and the receiving portion 75 are connected in such a form that a fixing member (not shown) or the like attached to the tip of the piston rod 72 in the hydraulic cylinder 71 is fixed to the circumferential surface of the receiving portion 75. Thereby, in the swing drive unit 60, the piston rod 72 is driven forward and backward in the hydraulic cylinder 71 of the swing driving device 70, and the forward and backward movement of the piston rod 72 is received by the receiving portion 75, so that the cylinder body 73 in the hydraulic cylinder 71 advances and retreats in the conveying direction X and the opposite direction to the conveying direction X, and accordingly, the frame 62 to which the hydraulic cylinder 71 is attached rotates about the pillar 68 (specifically, the center 68*c* of the pillar 68, also referred to as center of rotation 68*c*).

Note that as for the center of rotation 68*c* (the center 68*c* of the pillar 68), the frame 62 is attached to the pillar 68 so that the position of the corner portion 47*f* in the lower plate 47 and the center 68*c* of the pillar 68 substantially coincide with each other in a plan view, as described above. Therefore, the center of rotation 68*c* is the position of the corner portion 47*f* with respect to the lower plate 47. The position of the corner portion 47*f* is, with respect to the width direction Y, a position that can coincide with the inner side edge R8 (side edge on the center side of the curve) of both side edges R7 and R8 in the reinforcing fiber material R2. In this way, in the present embodiment, the center of rotation 68*c* is set to a position that can coincide with the position of the inner side edge R8 in the reinforcing fiber material R2. The inner side edge R8 corresponds to "one side edge" as referred to in the present invention.

Along with the rotation movement of the frame 62, the shaping mold unit 40 (the lower mold 41, and the upper mold 42 and both the side molds 43 and 44 supported by each mold driving device) on the frame 62 is rotationally driven between an initial position and a rotation position, as shown in FIG. 12A. Note that the initial position is a position where the longitudinal direction of the support beams 65 and 66 of the frame 62 substantially coincides with the width direction Y, and is a position where the arrangement direction of both the side molds 43 and 44 of the shaping mold unit 40 substantially coincides with the width direction Y.

In addition, the rotation position is a position where the piston rod 72 in the hydraulic cylinder 71 is most advanced, and is a position on a downstream side with respect to the initial position. Therefore, at the rotation position, the frame 62 is in a state in which the longitudinal direction of the support beams 65 and 66 forms a predetermined angle with respect to the width direction Y.

In addition, the shaping mechanism 13 of the present embodiment also serves as the pulling-out mechanism 15 as described above. Therefore, as shown in FIGS. 1 and 2, the shaping mechanism 13 is configured so that the base 61 supporting the frame 62 on which the shaping mold unit 40 is supported is driven forward and backward in the conveying direction X and the opposite direction to the conveying direction X. Specifically, as shown in FIGS. 1 and 6, in the shaping mechanism 13, a pair of rails 77 and 77 are fixedly arranged below the base 61. Both the rails 77 and 77 are substantially parallel to the conveying direction X and are arranged symmetrically to the center of the base 61 with respect to the width direction Y (the long side direction of the upper surface of the base 61).

In addition, as shown in FIGS. 2 and 6, a pair of guide members 78 and 78 whose displacement is guided by the respective rails 77 is attached to a lower surface of the base 61. Note that, in the present embodiment, the guide member 78 is composed of a block-shaped member such as an LM block in a so-called LM guide (registered trademark). The base 61 is placed on the pair of rails 77 and 77 with the guide members 78 and 78 interposed therebetween, and is supported by the rails 77 and 77 so as to be capable of being displaced in the conveying direction X.

Furthermore, the shaping mechanism 13 includes a drive mechanism 80 that drives the base 61 forward and backward in the conveying direction X and the opposite direction to the conveying direction X. The drive mechanism 80 is composed of a ball screw mechanism 80 in the present embodiment. Additionally, the ball screw mechanism 80 is provided in a form of being connected to the base 61 on the upstream side of the base 61.

Specifically, as shown in FIG. 6, a through hole 61h penetrating in the conveying direction X (the short side direction of the upper surface of the base 61) is formed in the base 61 at a substantially center position in the width direction Y. Furthermore, as shown in FIG. 7, a nut 81 in the ball screw mechanism 80 is attached to an upstream-side end of the through hole 61h. Additionally, on the upstream side of the base 61, a screw shaft 82 in the ball screw mechanism 80 is provided to be substantially parallel to the conveying direction X. Furthermore, the screw shaft 82 is connected to the base 61 on one end side in the form of being screwed into the nut 81 attached to the base 61. Additionally, as shown in FIGS. 1 and 2, the ball screw mechanism 80 includes a servo motor 85 as a drive source. The screw shaft 82 is connected to an output shaft of the servo motor 85 at the other end.

As shown in FIGS. 1 and 2, the shaping mechanism 13 is driven forward and backward in such a form that the screw shaft 82 is rotationally driven in forward and reverse directions by the servo motor 85 in the ball screw mechanism 80, thereby guiding the base 61 in the conveying direction X by the pair of rails 77 and 77. Thereby, the shaping mold unit 40 on the frame 62 supported with respect to the base 61, along with the advance and retreat drive of the base 61, is reciprocated between a shaping position and a pulling-out completion position in the conveying direction X and the opposite direction to the conveying direction X. Note that the shaping position is a position where the shaping operation (pressurization on the reinforcing fiber material R2) by the shaping mold unit 40 is performed, and is the same position as the initial position. Additionally, the pulling-out completion position is a position on a downstream side with respect to the shaping position, and is a position away from the shaping position by a distance slightly smaller than the dimension in the direction of the path of the shaping mold unit 40.

Figure 10:
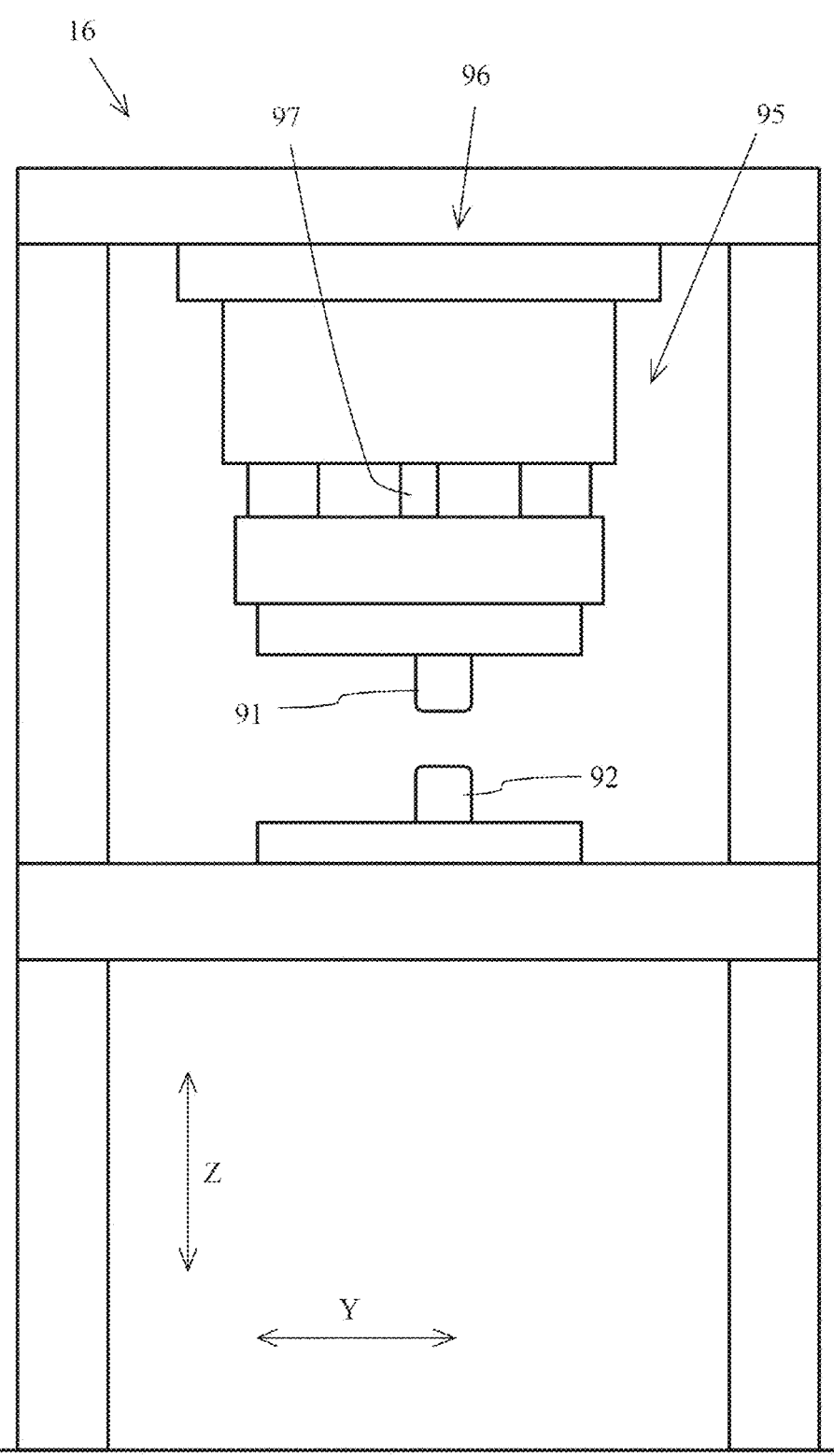
FIG. 10 is a front view of a holding mechanism in the curve shaping apparatus.

Additionally, in the present embodiment, the holding mechanism 16 is provided downstream of the shaping mechanism 13 as described above. As shown in FIG. 10, the holding mechanism 16 includes, as a configuration for holding the reinforcing fiber material R2, a pair of holding bodies 91 and 92 arranged to vertically sandwich the path and a holding body driving device 95 that drives the holding body 91.

The pair of holding bodies 91 and 92 is composed of a block-shaped member forming a substantially rectangular parallelepiped. Furthermore, the holding body 92 on a lower side (lower holding body 92) is fixedly arranged at a position where a position of an upper surface thereof coincides with the height position of the path with respect to the upper-lower direction Z. In addition, the holding body 91 on an upper side (upper holding body 91) is provided such that a lower surface thereof faces the upper surface of the lower holding body 92. However, the upper holding body 91 is arranged at a position (non-holding position) spaced upward from the lower holding body 92 during a standby mode where the reinforcing fiber material R2 is not held. Additionally, each holding body is provided such that a side surface thereof is substantially parallel to the conveying direction X. Note that, as shown in FIGS. 11A and 11D, the dimension of each of the holding bodies 91 and 92 in the width direction Y is about half the dimension of the interval between the inner surfaces of both the side end portions R4 and R5 in the reinforcing fiber material R2. Furthermore, each of the holding bodies 91 and 92 is arranged to be located near the center of the central portion R3 in the reinforcing fiber material R2 shaped into a curve shape by the shaping mechanism 13 on the upstream side of the holding mechanism 16 with respect to the width direction Y.

As shown in FIG. 10, the holding body driving device 95 is provided to drive the upper holding body 91 at the non-holding position forward and backward with respect to the lower holding body 92 so as to hold the reinforcing fiber material R2 by both the holding bodies 91 and 92. Note that, in the present embodiment, the holding body driving device 95 is configured to use a hydraulic cylinder 96 as a driving means. The holding body driving device 95 attaches the upper holding body 91 to a piston rod 97 of the hydraulic cylinder 96, thereby supporting the upper holding body 91 so that the upper holding body 91 is at the non-holding position during the standby mode. Furthermore, the holding body driving device 95 drives the upper holding body 91 forward and backward between a holding position where the reinforcing fiber material R2 is held and the non-holding position.

In addition, as shown in FIG. 1, the continuous molding machine 1 including the molding mechanism 3 and the curve shaping apparatus 4 described above includes a control device 5 that controls drive of the molding mechanism 3 and drive of each mechanism in the curve shaping apparatus 4. Note that since the control device 5 also controls drive of each mechanism in the curve shaping apparatus 4, it also functions as a drive control device 5 of the curve shaping apparatus 4. As a result of the molding mechanism 3 and each mechanism (including devices) 11 to 16 in the curve shaping apparatus 4 being controlled by the control device 5, the operations of those mechanisms 11 to 16 are sequentially performed as follows.

As shown in FIG. 3, first, in the molding mechanism 3, the movement of the upper mold 3b toward the lower mold 3c is started by the mold driving device 3d. Thereby, the three sheets of reinforcing fiber base materials R1 supplied from the supply device 2 and overlapped are clamped and pressurized by the upper mold 3b and the lower mold 3c. In addition, the upper mold 3b and the lower mold 3c are each heated, and the heating temperature is controlled to the temperature as described above by the control device 5. Therefore, the above pressurization is performed along with heating, and as a result, the portion of the reinforcing fiber base material R1 pressurized by the molding mechanism 3 (upper mold 3b, lower mold 3c) is molded into the Z-shaped reinforcing fiber material R2.

Then, after the completion of the molding process, in which the molding is completed and the upper mold 3b is moved in a direction away from the lower mold 3c by the mold driving device 3d and is placed at the original position before pressurization, as shown in FIGS. 1 and 2, an operation (pulling-out operation) of pulling out the reinforc-
ing fiber material R2 by the pulling-out mechanism 15
(shaping mechanism 13) is performed in the curve shaping
apparatus 4. Thereby, the portion (molded portion) of the
reinforcing fiber material R2 molded by the molding mecha-
nism 3 moves to the curve shaping apparatus 4 side, and as
a result, the molded portion is moved to the heating device
12. For reference, an amount of movement of the molded
portion in one pulling-out operation is slightly smaller than
the dimension of the molded portion in the longitudinal
direction of the reinforcing fiber material R2. Therefore, in
the movement by the one pulling-out operation, a part on the
upstream side of the molded portion remains in the molding
mechanism 3, and the part overlaps with a next molded
portion, so that molding on the reinforcing fiber base mate-
rial R1 is performed continuously without gaps.

In addition, the molding mechanism 3 and the heating
device 12 are arranged with an interval larger than the
amount of movement. Therefore, in the process of the
molded portion reaching the heating device 12, the pulling-
out operation is performed multiple times. Additionally, in
the curve shaping apparatus 4, a shaping process and a
rotation process, which will be described below, are per-
formed between the above-described pulling-out operation
and the next pulling-out operation. Therefore, the pulling-
out operation is performed intermittently during each period
in which the shaping process and the rotation process are
performed. In addition, the clamping mechanism 11 is
provided between the molding mechanism 3 and the heating
device 12, and in the clamping mechanism 11, the driving
thereof is controlled so that the upper clamping body 21 is
moved to the clamping position by the clamping body
driving device 25 along with the completion of the pulling-
out operation. Thereby, after the molded portion is caused to
reach the position of the clamping mechanism 11 by the
pulling-out operation, the clamping mechanism 11 enters a
state (clamping state) in which the molded portion is
clamped by the upper clamping body 21 and the lower
clamping body 22. In addition, prior to the start of the next
pulling-out operation, the upper clamping body 21 is moved
to the upper standby position by the clamping body driving
device 25, and accordingly, the clamping mechanism 11
enters a state (non-clamping state) in which the clamping
state is released (the clamping mechanism is switched from
the clamping state to the non-clamping state).

In the heating device 12, both the heating members 31 and
32 (the upper heating member 31 and the lower heating
member 32) are heated as described above, and the heating
temperature is controlled to the temperature as described
above (360° C. higher than the deformable temperature) by
the control device 5. Note that as for the heating tempera-
ture, as a result of the movement of the molded portion being
performed intermittently as described above, the molded
portion remains in the heating device 12 over the intermit-
tent period. Furthermore, the heating temperature (360° C.)
is set so that the temperature of the molded portion becomes
higher than the deformable temperature while the molded
portion remains in the heating device 12 and before the
rotation process is started.

However, the clamping mechanism 11 is provided
upstream of the heating device 12, and clamping by the
clamping mechanism 11 is performed along with heating, as
described above. Thereby, the molded portion is also heated
by the clamping mechanism 11 in the process of reaching the
heating device 12. Therefore, the heating temperature in the
heating device 12 is also set in consideration of the heating
by the clamping mechanism 11. For reference, the heating temperature by the clamping mechanism 11 is a temperature
set lower than the deformable temperature as described
above, but the heating of the clamping mechanism 11 (upper
clamping body 21, lower clamping body 22) at the set
heating temperature is also controlled by the control device
5.

Figures 14A, 14B, 14C, 14D:
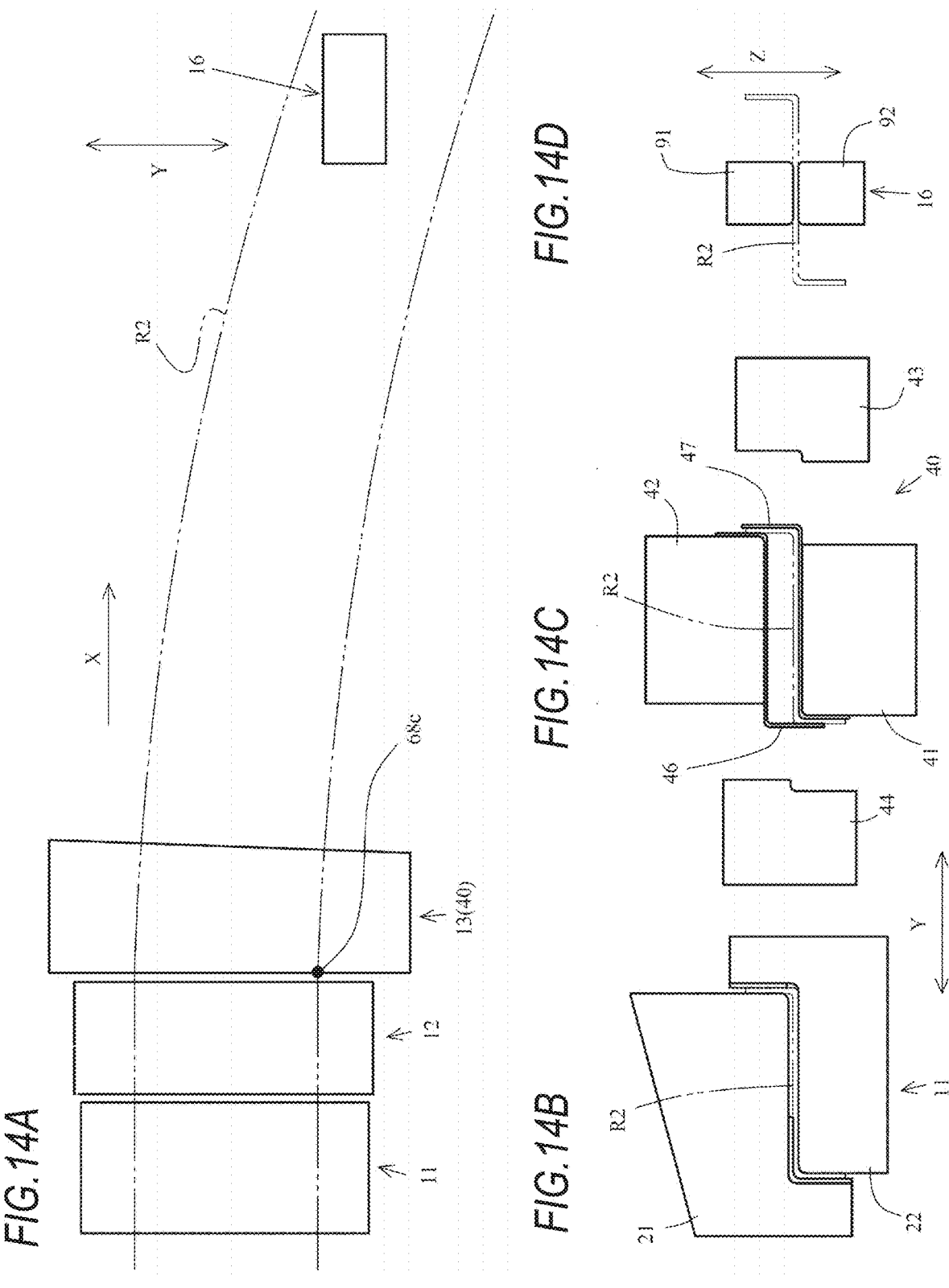
FIGS. 14A to 14D are illustrative diagrams showing a next operation of FIGS. 13A to 13D.
Figures 15A, 15B, 15C, 15D:
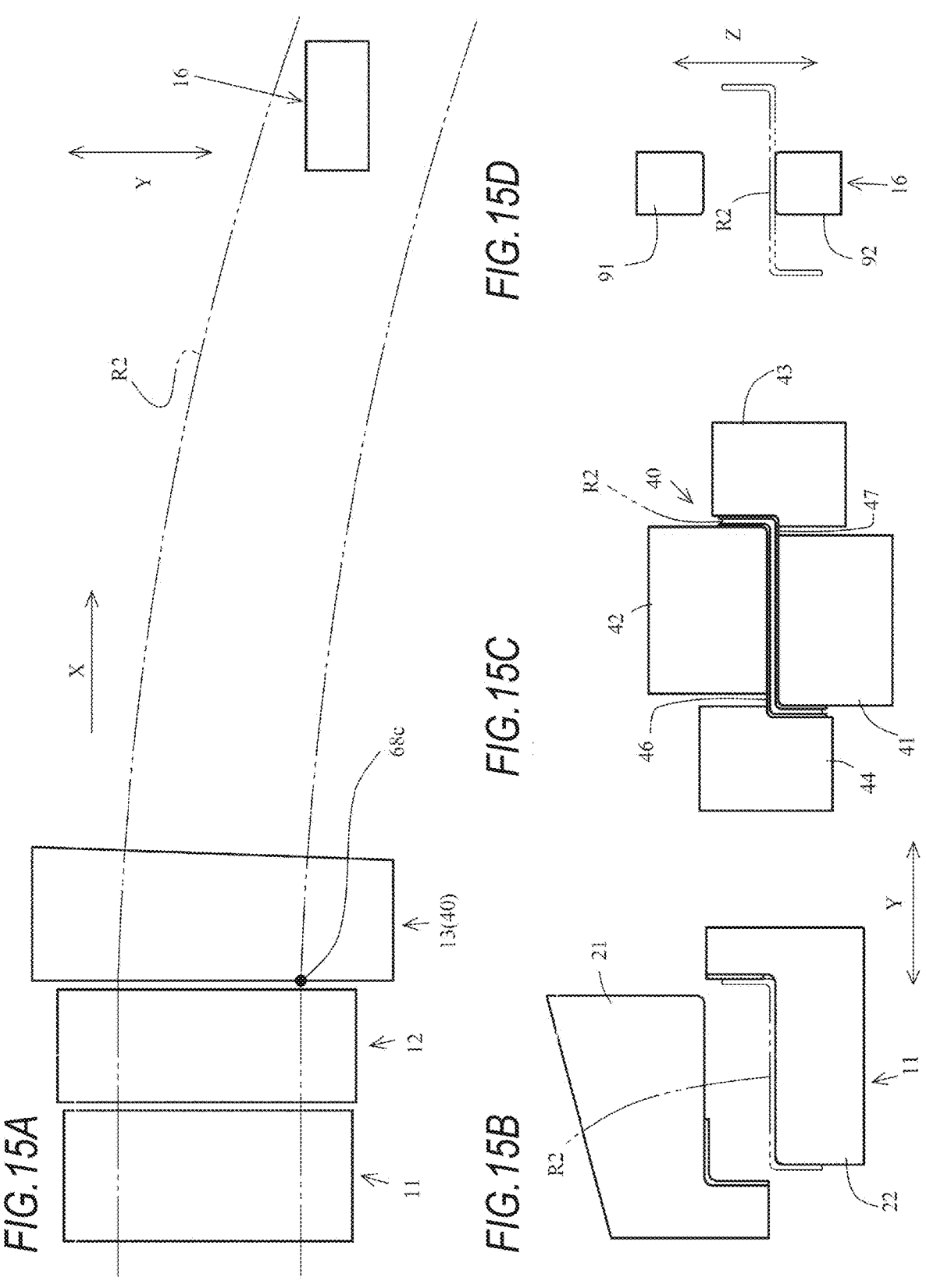
FIGS. 15A to 15D are illustrative diagrams showing a next operation of FIGS. 14A to 14D.
Figures 16A, 16B, 16C, 16D:
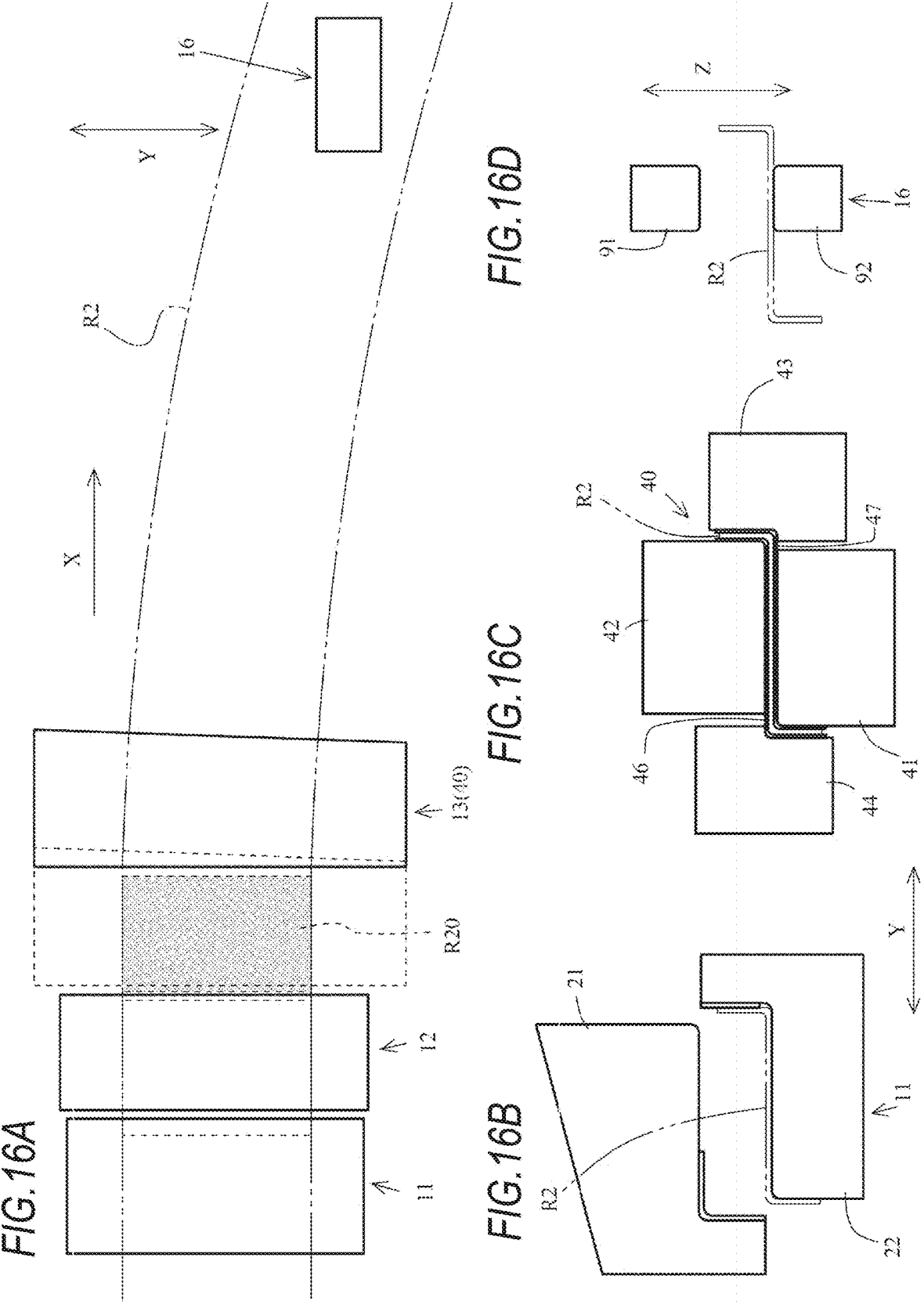
FIGS. 16A to 16D are illustrative diagrams showing a next operation of FIGS. 15A to 15D.
Figures 18A, 18B, 18C, 18D:
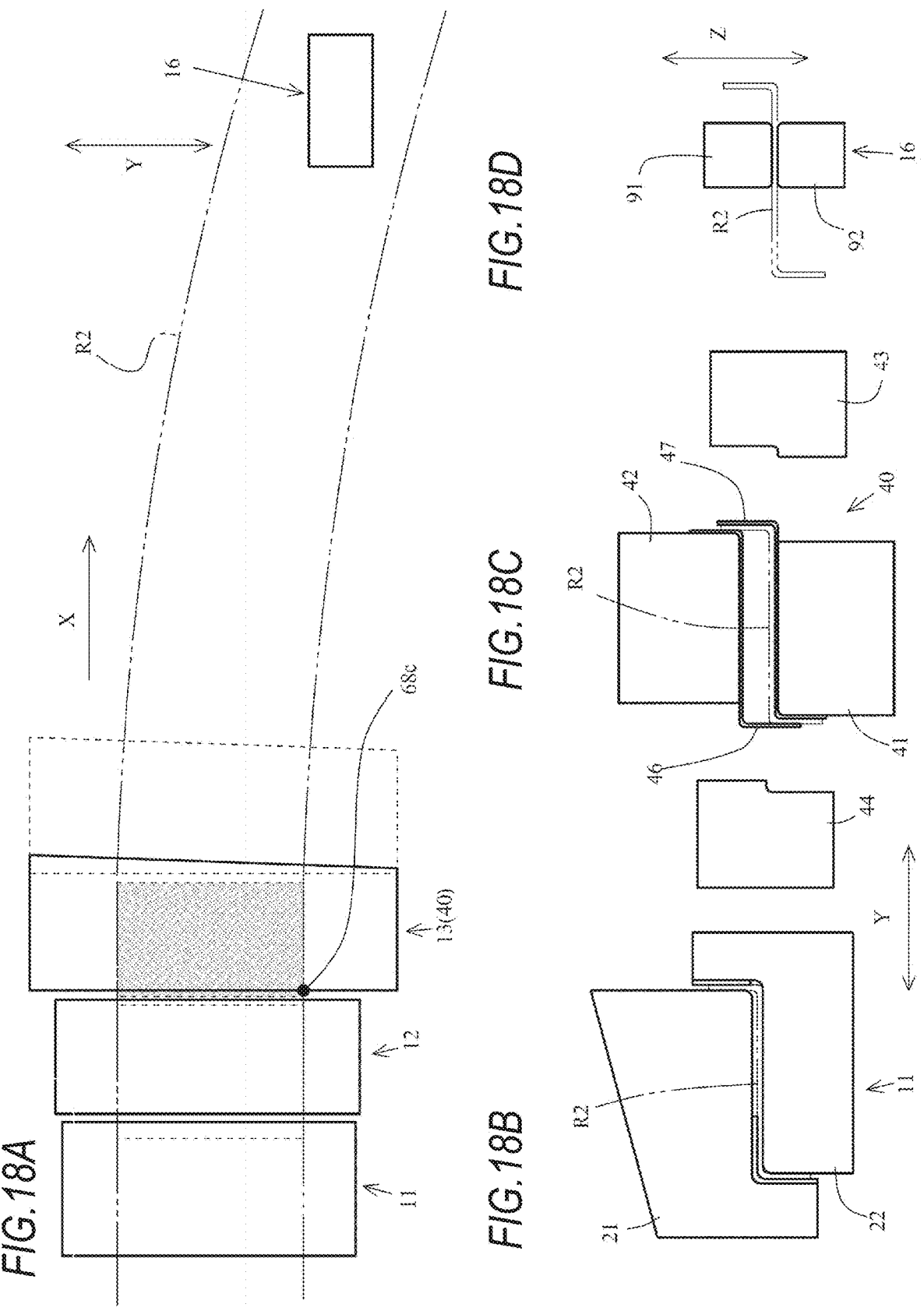
FIGS. 18A to 18D are illustrative diagrams showing a next operation of FIGS. 17A to 17D.

In the shaping mechanism 13, the shaping mold unit 40,
which is positioned at the pulling-out completion position in
accordance with the pulling-out operation, is returned to the
initial position (the original position before the pulling-out
operation is performed), as shown in FIG. 14A, after
completion of the pulling-out operation. When returned to
the initial position, as shown in FIG. 14C, the shaping mold
unit 40 is in a state in which the upper mold 42 and both the
side molds 43 and 44 are located at the corresponding
standby positions. Furthermore, in the shaping mechanism
13, the rotation process by the shaping mold unit 40 is
started. Note that, at the start of the rotation process, the
molded portion heated in the heating device 12 as described
above is at a temperature higher than the deformable tem-
perature.

In the rotation process, as shown in FIGS. 11A to 11D,
first, the upper mold 42 and both the side molds 43 and 44
in the shaping mold unit 40 are moved to the corresponding
pressurization positions. Thereby, the shaping mold unit 40
enters a state (gripping state) in which the reinforcing fiber
material R2 is gripped by the respective molds.

Next, as shown in FIGS. 12A to 12D, the shaping mold
unit 40 is rotated from the initial position toward the rotation
position by the swing driving device 70 in the swing drive
unit 60. For reference, in the present embodiment, the
rotation angle is set to about 2°. In addition, while the
shaping mold unit 40 is being rotated in this way, as shown
in FIGS. 11C and 12C, the clamping mechanism 11 is in the
clamping state in which the reinforcing fiber material R2 is
clamped. Thereby, the molded portion R20 heated in the
heating device 12 as described above is pulled toward the
rotation position side along with the rotation of the shaping
mold unit 40. However, in the rotation of the shaping mold
unit 40, the center of rotation 68c is a position that coincides
with the position of the inner side edge R8 in the reinforcing
fiber material R2 as described above.

As a result of being pulled toward the rotation position
side as described above, the molded portion R20 is in a state
in which a side edge (the outer side edge R7) on a lower side
end portion side (a side away from the center of rotation 68c)
of both the side edges R7 and R8 is linearly extended. On the
other hand, a side edge (the inner side edge R8) on an upper
side end portion side of the molded portion R20 is in a state
in which a length thereof remains unchanged compared to
before the rotation of the shaping mold unit 40 toward the
rotation position is performed. Thereby, the molded portion
R20 is in a state in which the length of the outer side edge
R7 is longer than the length of the inner side edge R8.

Figures 13A, 13B, 13C, 13D:
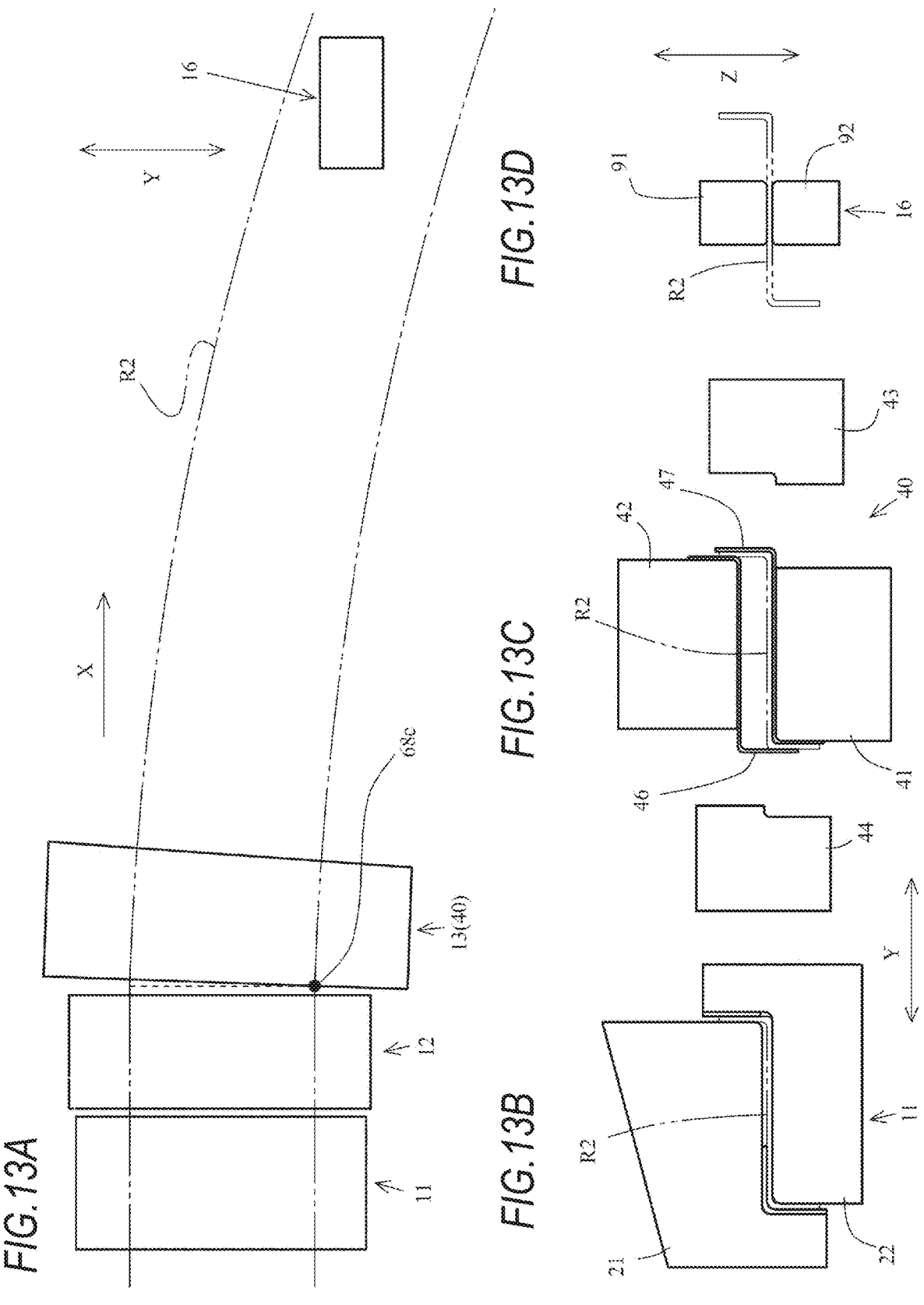
FIGS. 13A to 13D are illustrative diagrams showing a next operation of FIGS. 12A to 12D.

Then, as shown in FIGS. 13A to 13D, the upper mold 42
and both the side molds 43 and 44 are moved to the
corresponding standby positions (original positions before
the pressurization), and accordingly, the shaping mold unit
40 enters a state (non-gripping state) in which the gripping
state is released, and as shown in FIGS. 14A to 14D, is
returned to the initial position by the swing driving device 70
in the non-gripping state. Note that while the shaping mold
unit 40 is returned (rotated) to the initial position, as shown
in FIGS. 13D and 14D, the upper holding body 91 is moved
to the holding position by the holding body driving device
95, and the holding mechanism 16 is in a state (holding state)
in which the reinforcing fiber material R2 is held by the upper holding body 91 and the lower holding body 92. Thereby, while the shaping mold unit 40 is rotated toward the initial position, as shown in FIGS. 13C and 14C, the reinforcing fiber material R2 is placed on the lower mold 41 in the shaping mold unit 40, and the force toward the initial position side, accompanied by sliding contact of the lower mold 41 (lower plate 47), acts on the reinforcing fiber material R2, but the displacement (positional misalignment) of the reinforcing fiber material R2 due to the action of the force does not occur.

Then, following the completion of the rotation process as a result of the shaping mold unit 40 being returned (rotated) to the initial position as described above, the pulling-out process for the pulling-out operation is started in the shaping mechanism 13 (pulling-out mechanism 15). In the pulling-out process, as shown in FIGS. 15A to 15D, first, the upper mold 42 and both the side molds 43 and 44 in the shaping mold unit 40 are moved to the corresponding pressurization positions, and the shaping mold unit 40 enters a state in which the reinforcing fiber material R2 is gripped by the respective molds. Note that, as the shaping mechanism 13 (pulling-out mechanism 15) enters the state in which the reinforcing fiber material R2 is gripped, the clamping mechanism 11 enters the non-clamping state, and the holding mechanism 16 enters the state (non-holding state) in which the holding state is released.

Furthermore, as shown in FIGS. 16A to 16D, the shaping mold unit 40 is moved from the initial position to the pulling-out completion position on the downstream side by the ball screw mechanism 80 as a drive mechanism in the pulling-out mechanism 15, so that the pulling-out operation is performed. Thereby, the molded portion R20 in which the lengths of both the side edges R7 and R8 are different as described above is moved (pulled out from the position of the heating device 12), and the molded portion R20 is positioned at the initial position.

Then, as shown in FIGS. 17A to 17D, the upper mold 42 and both the side molds 43 and 44 are moved to the corresponding standby positions, and accordingly the shaping mold unit 40 enters a state in which the gripping of the reinforcing fiber material R2 is released, and as shown in FIGS. 18A to 18D, is returned to the initial position by the ball screw mechanism 80. Note that, prior to the shaping mold unit 40 being returned to the initial position in this way, as shown in FIGS. 17A to 17D, the clamping mechanism 11 enters the clamping state, and the holding mechanism 16 enters the holding state.

Then, following the completion of the pulling-out process as a result of the shaping mold unit 40 being returned to the initial position as described above, the shaping process for a shaping operation by the shaping mold unit 40 is started in the shaping mechanism 13. Note that the shaping operation is performed by holding the reinforcing fiber material R2 by the shaping mold unit 40 (respective molds) and pressurizing the reinforcing fiber material R2; however, the gripping of the reinforcing fiber material R2 by the shaping mold unit 40 is the same operation as the gripping in the rotation process described above (it also serves as the gripping in the rotation process). For reference, the initial position where the shaping (gripping) is performed is the position where the shaping operation is performed, and is also called the shaping position above.

As for the shaping operation, the gripping by the shaping unit 40 is performed by moving the upper mold 42 and both the side molds 43 and 44 to the corresponding pressurization positions as described above. However, specifically, the movement of each of the molds 42 to 44 is performed in such a way that the movement of the upper mold 42 precedes the movement of the side molds 43 and 44. More specifically, in the shaping operation, first, the upper mold 42 is moved to the upper pressurization position by the upper mold driving device 52. Next, after the movement of the upper mold 42 to the upper pressurization position is completed, the movement of the left side mold 43 by the left side mold driving device 53 and the movement of the right side mold 44 by the right side mold driving device 54 are started, and accordingly, the left side mold 43 and the right side mold 44 are moved to the left pressurization position and the right pressurization position, respectively. Then, when the movement of the left side mold 43 to the left pressurization position and the movement of the right side mold 44 to the right pressurization position are completed, as shown in FIG. 11C, the shaping mold unit 40 enters the gripping state in which the molded portion is gripped (pressurized) by the respective molds 41 to 44.

In addition, since each of the molds 41 to 44 in the shaping mold unit 40 is heated as described above, the gripping is performed along with heating. Then, the molded portion is shaped by gripping (heating) accompanied by such heating. Note that the heating temperature of each of the molds 41 to 44 is a temperature set so that shaping can be performed appropriately as described above (specifically, 220° C., which is lower than the deformable temperature), and is controlled by the control device 5. Furthermore, since the shaping surfaces 41a to 44a of the respective molds 41 to 44 in the shaping mold unit 40 are curved surfaces as described above, as a result of being pressurized by such curved surfaces, the molded portion is shaped to form a curve in a plan view.

The gripping (pressurizing) of the molded portion by the shaping mold unit 40 is completed in this way, so that the shaping process of shaping the molded portion into a curved shape is completed. As described above, since the gripping for the shaping also serves as the gripping in the rotation process described above, the next rotation process is started after the shaping process is completed. Note that the shaping mold unit 40 of the present embodiment is switched between the gripping state and the non-gripping state in the rotation process as described above, and is also rotationally driven between the initial position and the rotation position. Accordingly, the shaping mold unit 40 also functions as the "gripping unit" as referred to in the present invention.

As such, according to the curve shaping apparatus 4 of the present embodiment, prior to shaping the straight reinforcing fiber material R2 into a curved shape, the molded portion in the reinforcing fiber material R2 heated by the heating device 12 is in a state in which the lengths of both the side edges R7 and R8 are different, as in the case of a curved shape. Then, the shaping operation by the shaping mold unit 40 as described above is performed on the molded portion, so that the molded portion is shaped into a curved shape. Thereby, a curved reinforcing fiber material R2 having desired quality and strength can be manufactured without causing crushing in the inner portion of the reinforcing fiber material R2.

Furthermore, in the curve shaping apparatus 4 of the present embodiment, as described above, the shaping mold unit 40 also functions as the gripping unit, the shaping mechanism 13 also functions as the swing mechanism 14 and the pulling-out mechanism 15, and the pulling-out process, the rotation process, and the shaping process can be performed by a single mechanism. Therefore, according to the curve shaping apparatus 4, the manufacture of the curved reinforcing fiber material R2 as described above can be realized with a simplified configuration as a whole.

In addition, the curve shaping apparatus 4 of the present embodiment is configured to include, as a configuration for preventing the positional misalignment of the reinforcing fiber material R2 accompanying the rotation of the shaping mold unit 40 toward the initial position, the holding mechanism 16 as described above on the downstream side of the shaping mechanism 13, separately from the shaping mechanism 13 (swing mechanism 14). Thereby, the configuration itself for preventing the above-described positional misalignment has a simple configuration, and complexity of the configuration of the curve shaping apparatus 4 can be avoided.

Note that the present invention is not limited to the above-described embodiment (the above embodiment) of the curve shaping apparatus 4, and can also be implemented in following other embodiments (variations) such as (1) to (12) below.

(1) In the above embodiment, the swing mechanism 14 is configured such that the center of rotation 68c of the gripping unit (shaping mold unit 40) coincides with the position of the inner side edge R8 (one side edge) of both the side edges R7 and R8 of the reinforcing fiber material R2 with respect to the width direction Y and coincides with the position of the corner portion on the upstream side of the lower plate 47 attached to the lower mold 41 with respect to the direction of the path (the conveying direction X). Note that regarding the position in the direction of the path, as described above, the lower plate 47 has the same dimension as the lower mold 41 in the direction of the path, and is attached to the lower mold 41 in such a way that the position of the center thereof in the direction of the path coincides with the position of the center of the lower mold 41. Therefore, the position of the corner portion of the lower plate 47, which becomes the center of rotation 68c, coincides with the position of the side surface on the upstream side of the lower mold 41 (each of the molds 41 to 44 of the shaping mold unit 40) with respect to the direction of the path. In other words, the swing mechanism 14 of the above embodiment is configured such that, with respect to the direction of the path, the center of rotation 68c of the gripping unit coincides with the position of the side surface on the upstream side of each of the molds 41 to 44 of the gripping unit (shaping mold unit 40).

However, in the present invention, the swing mechanism is not limited to being configured so that the center of rotation of the gripping unit is the position of the above embodiment. Specifically, the swing mechanism may be configured so that, with respect to the width direction Y, a position on the center side of the curve with respect to the inner side edge R8 (one side edge) of the reinforcing fiber material R2 becomes the center of rotation of the gripping unit. Additionally, the swing mechanism may be configured so that, with respect to the direction of the path, a position upstream or downstream of the position of the side surface on the upstream side of each mold of the gripping unit becomes the center of rotation of the gripping unit. Note that when the center of rotation of the gripping unit is set to a position different from that of the above embodiment, the inner side edge (one side edge) of the molded portion (the portion of the reinforcing fiber material R2 heated in the heating device 12) is linearly extended in the same manner as the outer side edge, as the gripping unit is rotated toward the pivoting position. However, the fact that the outer side edge is longer than the inner side edge is the same as in the above embodiment.

(2) In the above embodiment, the swing mechanism 14 has the configuration in which as a driving means for rotationally driving the gripping unit (shaping mold unit 40) between the initial position and the rotation position, a single cylinder (hydraulic cylinder) that reciprocates the gripping unit between the two positions is used. That is, a single double-acting cylinder is used as the driving means for reciprocating the gripping unit between the two positions.

However, in the present invention, the driving means in the swing mechanism for reciprocating the gripping unit is not limited to such a single double-acting cylinder. For example, the driving means may be configured using two cylinders, one for forward movement and one for backward movement. Specifically, the driving means may be configured in such a way that the hydraulic cylinder as the driving means in the above embodiment is used as a single-acting cylinder for forward movement, and a new single-acting hydraulic cylinder for backward movement is added. Note that, in this case, the hydraulic cylinder for backward movement is provided to apply a force in a backward movement direction to the frame 62 on a side opposite to the hydraulic cylinder for forward movement with respect to the pillar 68 in the width direction Y.

In addition, in the case where a cylinder is used as the driving means as described above, the cylinder is not limited to the hydraulic cylinder and may be an air cylinder. In addition, the driving means is not limited to being configured using a cylinder as described above, and may be configured, for example, to use a motor as a drive source and to rotationally drive the pillar 68 or the like in the forward/reverse direction via a drive transmission mechanism such as a gear.

(3) In the above embodiment, in the curve shaping apparatus 4 including the swing mechanism 14 that performs the rotation process, the pulling-out mechanism 15 that performs the pulling-out process, and the shaping mechanism 13 that performs the shaping process, the shaping mechanism 13 is configured in the form of being able to perform the three processes so that the shaping mechanism 13 also functions as the swing mechanism 14 and the pulling-out mechanism 15. That is, in the above embodiment, the shaping mold unit 40 in the shaping mechanism 13 also functions as the gripping unit in the swing mechanism 14 and functions as the configuration of gripping the reinforcing fiber material R2 when pulling out the reinforcing fiber material R2 in the pulling-out process, so that the three mechanisms 13 to 15 are unitized as a single unit.

However, in the present invention, the swing mechanism, the pulling-out mechanism, and the shaping mechanism are not limited to all being unitized as a single unit, and two of the three mechanisms may be unitized and one may be provided independently, or each mechanism may be provided independently.

For example, the shaping mechanism 13 and the pulling-out mechanism 15 may be unitized in such a way that the configuration for rotation in the shaping mechanism 13 of the above embodiment is omitted from the shaping mechanism 13, and the swing mechanism may be provided independently. In this case, the swing mechanism is provided on the downstream side although the shaping mechanism 13 and the pulling-out mechanism 15 are unitized. In addition, the swing mechanism includes a dedicated gripping unit and is configured to rotationally drive the gripping unit. Note that when the swing mechanism is provided independently in this way, the gripping unit may be configured to be able to grip at least both end portions of the reinforcing fiber material R2. Specifically, as in the upper clamping body 21 and the lower clamping body 22 to which the clamping pieces 24 and 23 in the clamping mechanism 11 of the above embodiment are attached, the gripping unit may be configured to be able to grip both side end portions R4 and R5 and only a part of the central portion R3 in the reinforcing fiber material R2 (only within a range where the clamping pieces 24 and 23 are present).

In addition, the shaping mechanism 13 is not limited to being unitized with other mechanisms as described above, and may be provided as a single mechanism independent of other mechanisms. In this case, the swing mechanism and the pulling-out mechanism may be unitized or may each be provided independently.

(4) In the above embodiment, the shaping mechanism 13 is configured so that the side molds 43 and 44 in the shaping mold unit 40 are driven forward and backward only in the horizontal direction. However, in the present invention, the shaping mechanism 13 may be configured so that the side molds 43 and 44 are driven forward and backward not only in the horizontal direction but also in the vertical direction. In this case, the reinforcing fiber material R2 at the exposed portions of the upper mold 42 and the lower mold 41 therebetween, which are provided with being positionally misaligned in the width direction Y as described above, is also pressurized by the side molds 43 and 44. In addition, in this case, since the reinforcing fiber material R2 at the exposed portions can be pressurized by the side molds 43 and 44, the plates (the upper plate 46 and the lower plate 47) provided so as to pressurize the reinforcing fiber material R2 at the exposed portions in the above embodiment can be omitted.

(5) In the shaping mechanism 13 of the above embodiment, the shaping mold unit 40 for shaping the reinforcing fiber material R2 having a Z-shaped cross-sectional shape is configured to include the upper mold 42, the lower mold 41, and the pair of side molds 43 and 44 (the left side mold 43 and the right side mold 44), which are provided independently.

However, the shaping mold unit 40 may be configured such that the lower mold 41 and the left side mold 43 are included in a single mold (a single mold includes the lower mold 41 and the left side mold 43). Note that in this case, a single mold including the lower mold 41 and the left side mold 43 is, for example, formed in such a form that the lower mold 41 and the left side mold 43 of the above embodiment are fixedly arranged and integrated, and has the same form as the lower clamping body 22 in the clamping mechanism 11 of the above embodiment. In addition, in this case, since the position of the shaping surface 43a in the portion corresponding to the left side mold 43 is configured not to change, the upper mold 42 is driven forward and backward not only in the vertical direction as in the above embodiment, but also in the horizontal direction so that the pressurization on the upper side end portion R4 in the reinforcing fiber material R2 is performed.

Additionally, the shaping mold unit 40 may be configured such that the upper mold 42 and the right side mold 44 are included in a single mold (a single mold includes the upper mold 42 and the right side mold 44). Note that in this case, a single mold including the upper mold 42 and the right side mold 44 is, for example, formed in such a form that the upper mold 42 and the right side mold 44 of the above embodiment are integrated, and has the same form as the upper clamping body 21 in the clamping mechanism 11 of the above embodiment. In addition, in this case, the single mold including the upper mold 42 and the right side mold 44 is driven forward and backward in the vertical direction and the horizontal direction.

(6) In the above embodiment, the clamping mechanism 11 is configured to clamp both the side end portions R4 and R5 and a part of the central portion R3 in the reinforcing fiber material R2 by the pair of (two) clamping bodies (upper clamping body 21, lower clamping body 22) to which the clamping pieces 23 and 24 are attached. However, the clamping mechanism 11 is not limited to such a configuration. For example, the clamping mechanism 11 may include two sets of clamping bodies, and may be configured in such a form that one set of clamping bodies is provided to clamp the upper side end portion R4 in the reinforcing fiber material R2 and the other set of clamping bodies is provided to clamp the lower side end portion R5 and a part of the central portion R3 in the reinforcing fiber material R2.

In addition, in the present invention, the clamping mechanism 11 may be configured to clamp at least both end portions in the reinforcing fiber material R2, and is not limited to being configured to clamp both the side end portions R4 and R5 and a part of the central portion R3 in the reinforcing fiber material R2 as described above. Specifically, the clamping mechanism 11 may be configured to clamp only both the side end portions R4 and R5 in the reinforcing fiber material R2. In addition, the clamping mechanism 11 is not limited to being configured to partially clamp the reinforcing fiber material R2 as described above, and may be configured to clamp the entire reinforcing fiber material R2.

(7) In the above embodiment, the clamping mechanism 11 is configured so that the clamping bodies 21 and 22 are heated so as to heat the reinforcing fiber material R2 in the clamping state for the purpose of shortening the heating time of the reinforcing fiber material R2 by the heating device 12 provided on the downstream side of the clamping mechanism. However, in the present invention, the clamping mechanism 11 does not need to be configured to heat the reinforcing fiber material R2 (the clamping bodies 21 and 22) if the shortening of the heating time in the heating device 12 does not need to be considered.

(8) In the pulling-out mechanism 15 of the above embodiment, the drive mechanism for reciprocating the configuration (shaping mold unit 40) for gripping the reinforcing fiber material R2 in the conveying direction X and the opposite direction to the conveying direction X is configured by the ball screw mechanism 80. However, the drive mechanism is not limited to such a configuration, and may be configured by, for example, a rack and pinion mechanism, or may be configured using a linear motor as a drive source.

In addition, when the pulling-out mechanism is provided as a single mechanism independent of other mechanisms, the drive mechanism in the pulling-out mechanism is not limited to being configured to reciprocate the configuration for gripping the reinforcing fiber material R2 as described above, and may include a pair of rollers provided so as to be capable of clamping the reinforcing fiber material R2, and may be configured to pull out the reinforcing fiber material R2 by clamping the reinforcing fiber material R2 by both the rollers and rotationally driving one of the rollers.

(9) In the above embodiment, the heating device 12 is configured to heat the pair of fixedly arranged heating members 31 and 32, thereby heating the reinforcing fiber material R2 passing between both the heating members 31 and 32. However, the heating device 12 is not limited to being composed of the pair of heating members 31 and 32 as in the above embodiment, and may be configured in an arbitrary manner as long as it is possible to heat the entire reinforcing fiber material R2.

In addition, in the heating device 12 of the above embodiment, both the heating members 31 and 32 are fixedly provided and the interval between the heating members 31 and 32 is larger than the thickness of the reinforcing fiber material R2, so that the reinforcing fiber material R2 is heated in a non-contact manner. However, the heating device 12 may be configured, for example, to switch between a state in which the pair of heating members 31 and 32 clamp the reinforcing fiber material R2 and a state in which the clamping is released, and to heat the reinforcing fiber material R2 in a contact manner by the heating members 31 and 32.

(10) In the above embodiment, the holding mechanism 16 is configured to hold the reinforcing fiber material R2 by the pair of holding bodies 91 and 92. Note that the holding mechanism 16 is to prevent the reinforcing fiber material R2 from being positionally misaligned when the holding unit (shaping mold unit 40) is rotated toward the initial position as described above (during rotation). However, the holding mechanism is not limited to being configured as in the above embodiment, and may be configured in an arbitrary manner as long as it holds the reinforcing fiber material R2 so as to prevent the positional misalignment.

However, in the present invention, the curve shaping apparatus 4 is not limited to having such a holding mechanism, and may not include the holding mechanism. Specifically, instead of the holding mechanism, the curve shaping apparatus 4 may include a mechanism that keeps the reinforcing fiber material R2 in a non-contact state with respect to the gripping unit during the rotation. Specifically, a mechanism that lifts the reinforcing fiber material R2 and separates the reinforcing fiber material R2 from the lower member of the gripping unit (a member for holding the reinforcing fiber material R2, i.e., the lower mold 41 of the shaping mold unit 40 in the above embodiment) in the upper-lower direction Z, a mechanism that keeps the position of the reinforcing fiber material R2 in the upper-lower direction Z and displaces the lower member downward, and the like are considered. In addition, when a relationship between a state (hardness, surface viscosity, and the like) of the reinforcing fiber material R2 after shaping and the surface of the lower member in contact with the reinforcing fiber material R2 does not cause the reinforcing fiber material R2 to move even if the lower member slides against the reinforcing fiber material R2 as the gripping unit rotates (does not cause the positional misalignment), the holding mechanism or an alternative mechanism thereof can be omitted.

(11) In the above embodiment, the curve shaping apparatus 4 is provided as a part of the continuous molding machine 1 including the molding mechanism 3 for molding the reinforcing fiber base material R1 into the reinforcing fiber material R2. However, in the present invention, the curve shaping apparatus 4 may be provided independently of the continuous molding machine 1. Note that in this case, the reinforcing fiber material R2 supplied to the curve shaping apparatus 4 is molded in advance by the continuous molding machine 1 or the like provided independently of the curve shaping apparatus 4.

(12) In the above embodiment, the curve shaping apparatus 4 is configured such that the reinforcing fiber material R2 to be shaped is the reinforcing fiber material R2 having a Z-shaped cross-sectional shape as described above and the Z-shaped reinforcing fiber material R2 is shaped into a curve shape. However, the curve shaping apparatus of the present invention is not limited to the Z-shaped reinforcing fiber material R2, and as shown in FIGS. 19A and 19B, may be configured to shape a reinforcing fiber material R2b, R2c having a C-shaped or L-shaped cross-sectional shape into a curve shape.

Figure 19A:
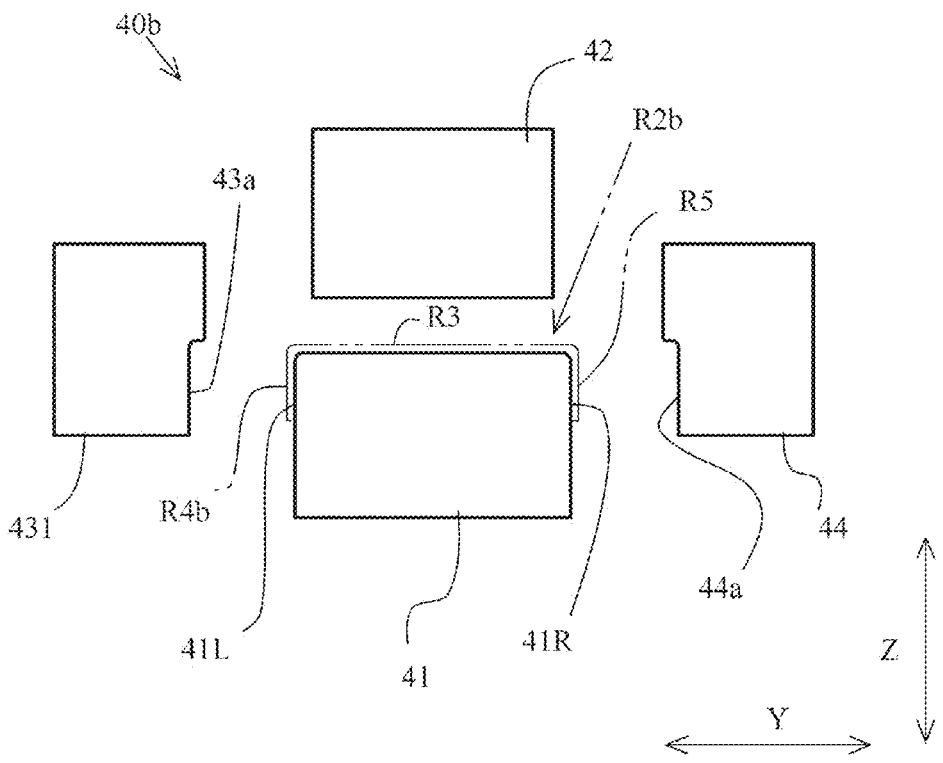
FIGS. 19A and 19B are illustrative diagrams showing other variations of the curve shaping apparatus.

For example, as shown in FIG. 19A, when the C-shaped reinforcing fiber material R2b is supplied to the shaping mold unit 40b of the curve shaping apparatus 4 with both side end portions R4b and R5 facing downward, the shaping of both the side end portions R4b and R5 is performed by pressurization between the lower mold 41 and both side molds 431 and 44. In this case, the portions of both side surfaces 41L and 41R in the lower mold 41, which face the shaping surfaces 43a and 44a of both the side molds 431 and 44, are formed as an inner shaping surface having a curved shape. In addition, in this case, the clamping mechanism, the heating device, the swing mechanism, and the pulling-out mechanism, which are components other than the shaping mechanism, are naturally configured corresponding to the C-shaped reinforcing fiber material R2b.

Figure 19B:
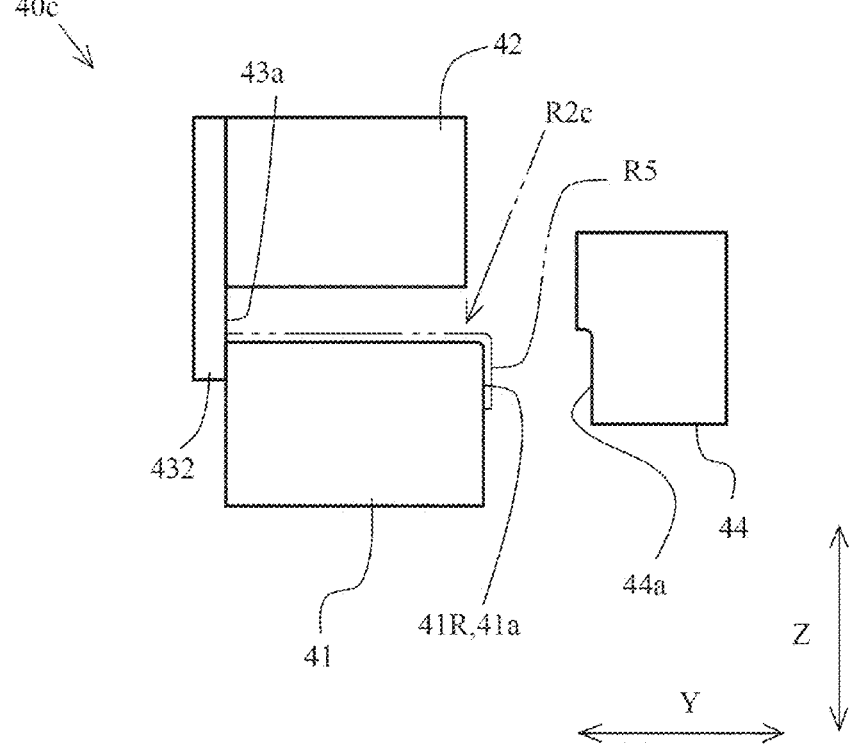

In addition, as shown in FIG. 19B, in the case of the L-shaped reinforcing fiber material R2c, the L-shaped reinforcing fiber material R2c has a shape in which one side end portion R4b is omitted with respect to the C-shaped reinforcing fiber material R2b. Therefore, an end portion on one side (an opposite side to the end portion R5 on the other side) in the reinforcing fiber material R2c may be shaped into a shape following the inner surface of the side mold (the left side mold 432 of the shaping mold unit 40c, in the shown example) located at a position on a side surface of the lower mold 41 with respect to the width direction Y.

More specifically, the left side mold 432 is provided in a form of being attached to the upper mold 42, and is provided so that the position of the inner surface thereof with respect to the width direction Y substantially coincides with the position of the side surface of the lower mold 41. In this case, the inner surface is formed as the outer shaping surface 43a that forms a curved shape. According to the configuration, when the heated reinforcing fiber material R2c is pressurized by the upper mold 42 and the lower die 41, the thermoplastic resin in the reinforcing fiber material R2c is in a state where it is intended to spread in the width direction Y, so that the reinforcing fiber material R2c (thermoplastic resin) has a shape that follows the inner surface of the left side mold 432 at the end portion. Since the inner surface of the left side mold 432 forms a curved shape as described above, the end portion of the reinforcing fiber material R2c is shaped into a curved shape.

The present invention is not limited to the above embodiment and the modified embodiments, and can be variously changed without departing from the gist of the present invention.

The invention claimed is:

1. A curve shaping apparatus for shaping a reinforcing fiber material so as to form a curve in a plan view while conveying the same on a defined path, the reinforcing fiber material being formed by molding a long sheet shaped reinforcing fiber base material in which a thermoplastic resin is used as a matrix material and a reinforcing fiber is oriented at an angle with respect to a longitudinal direction, the curve shaping apparatus comprising:

a heating device provided in the path and configured to heat the reinforcing fiber material to a temperature equal to or higher than a deformable temperature at which the reinforcing fiber material enters a deformable state;

a clamping mechanism provided upstream of the heating device and configured to be switchable between a clamping state in which at least both end portions of the reinforcing fiber material are clamped and a non-clamping state in which the clamping state is released;

a swing mechanism including a gripping unit provided downstream of the heating device and configured to be switchable between a gripping state in which at least both end portions of the reinforcing fiber material are gripped and a non-gripping state in which the gripping state is released, the swing mechanism being configured to rotationally drive the gripping unit between an initial position and a rotation position downstream of the initial position about a position of one side edge of the reinforcing fiber material or a position on a center side of the curve with respect to the side edge as a center of rotation;

a shaping mechanism including a shaping mold unit provided adjacent to the heating device on a downstream side of the heating device and including an upper mold, a lower mold, and a pair of side molds for shaping the reinforcing fiber material, the shaping mechanism being configured to heat the shaping mold unit to a temperature lower than the deformable temperature and drive the shaping mold unit to perform a shaping operation, and the shaping mechanism being configured such that, in order to shape the reinforcing fiber material into a curved shape, an outer shaping surface of each side mold of the shaping mold unit for shaping the reinforcing fiber material is formed as a curved surface for realizing the curve and an inner shaping surface of the upper mold and/or the lower mold facing the outer shaping surface is formed as a curved surface parallel to the outer shaping surface;

a pulling-out mechanism provided downstream of the heating device and configured to perform a pulling-out operation of pulling out a portion of the reinforcing fiber material heated by the heating device to a position where the shaping operation by the shaping mold unit is performed; and a drive control device configured to control drive of each mechanism so that each process of a rotation process of bringing the clamping mechanism into the clamping state and bringing the gripping unit positioned at the initial position by the swing mechanism into the gripping state and then rotating the gripping unit toward the rotation position, a pulling-out process of bringing the clamping mechanism into the non-clamping state and then causing the pulling-out mechanism to perform the pulling-out operation, and a shaping process of causing the shaping mold unit to perform the shaping operation by the shaping mechanism is performed in the order of the rotation process, the pulling-out process, and the shaping process.

2. The curve shaping apparatus according to claim 1, wherein the shaping mold unit is configured to function as the gripping unit, and the shaping mechanism is configured to rotationally drive the shaping mold unit between the initial position and the rotation position and to function as the swing mechanism.

3. The curve shaping apparatus according to claim 2, wherein the shaping mechanism is configured to cause the shaping mold unit to perform the pulling-out operation and to function as the pulling-out mechanism.

4. The curve shaping apparatus according to claim 1, further comprising a holding mechanism provided downstream of the swing mechanism and configured to be switchable between a holding state in which the reinforcing fiber material is held and a non-holding state in which the holding state is released, wherein the drive control device is configured to control drive of the holding mechanism so that the holding mechanism is kept in the holding state when rotating the gripping unit positioned at the rotation position toward the initial position.

\* \* \* \* \*